May 6, 1958 L. L. BOSKEN 2,833,426
AUTOMATIC TRANSFER APPARATUS
Filed July 19, 1952 8 Sheets-Sheet 1
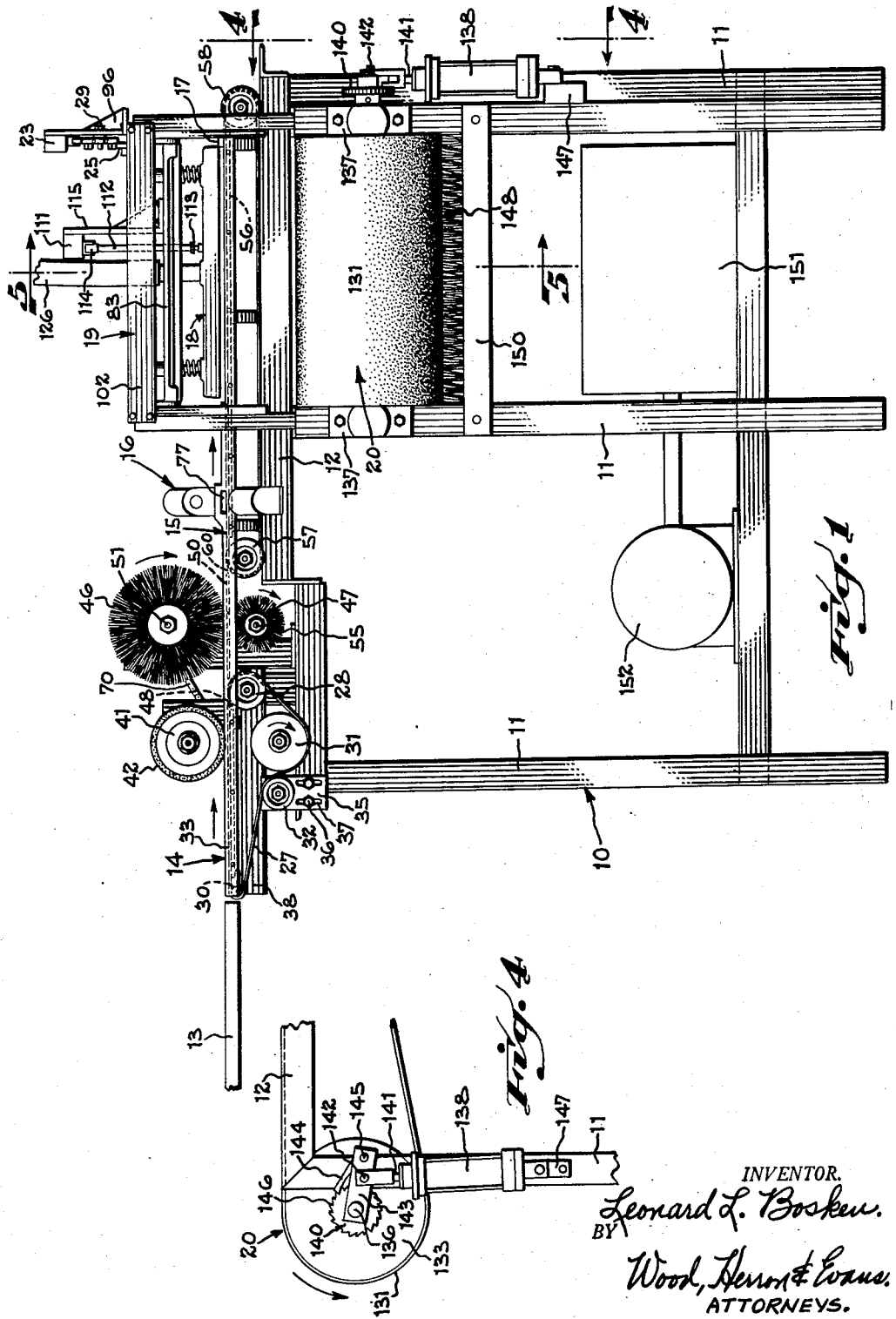
INVENTOR.
Leonard L. Bosken.
BY
Wood, Herron & Evans.
ATTORNEYS.

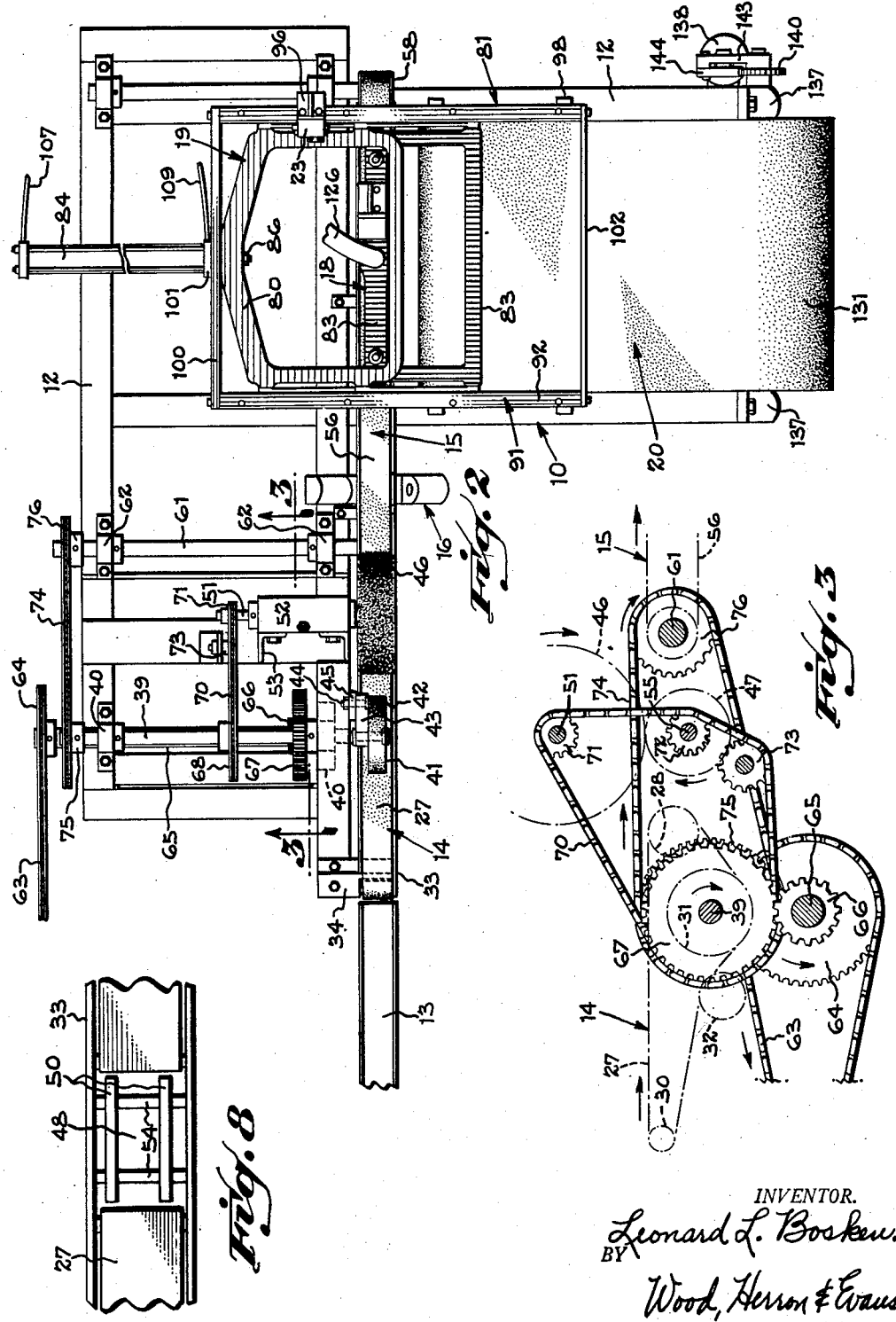

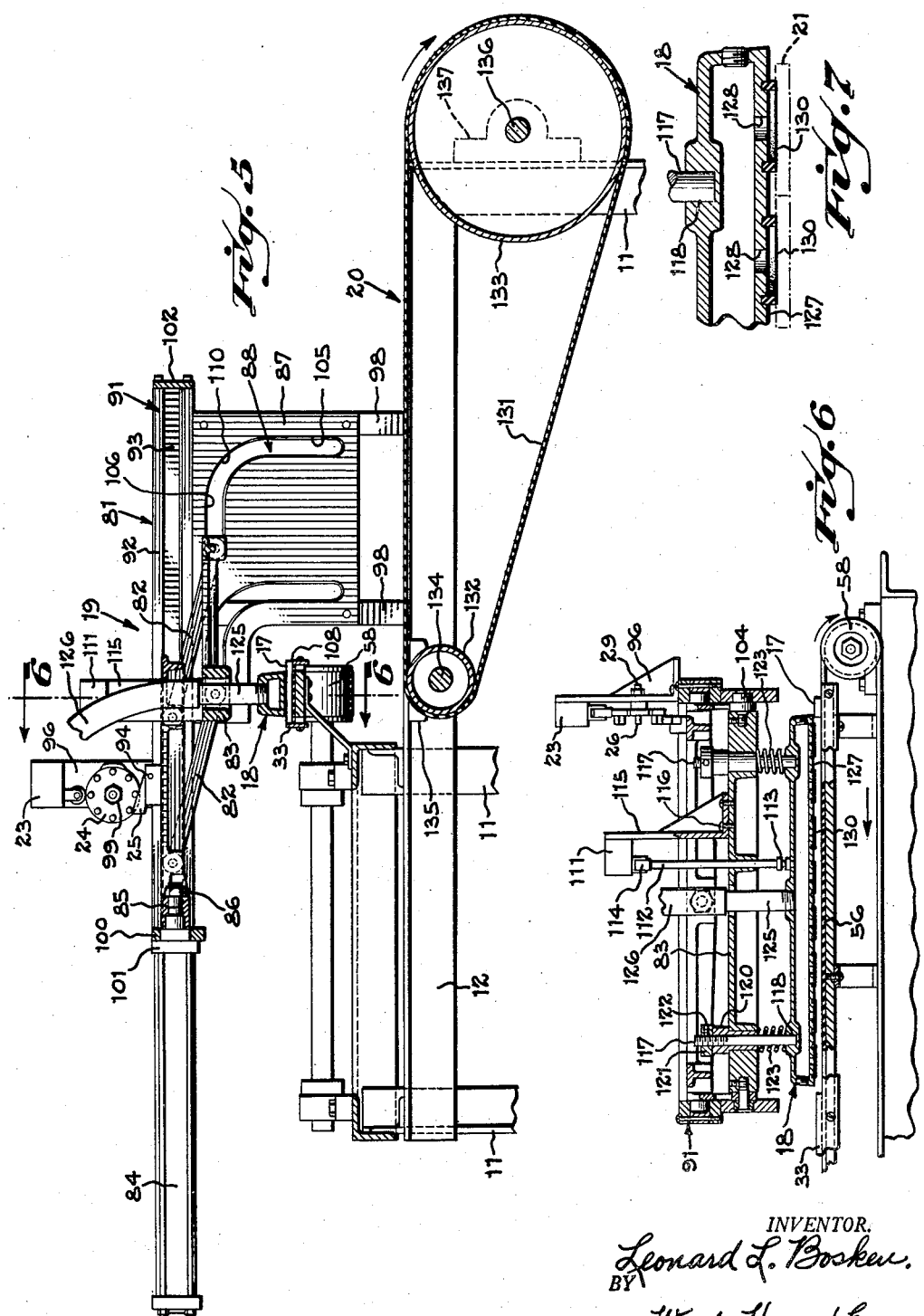

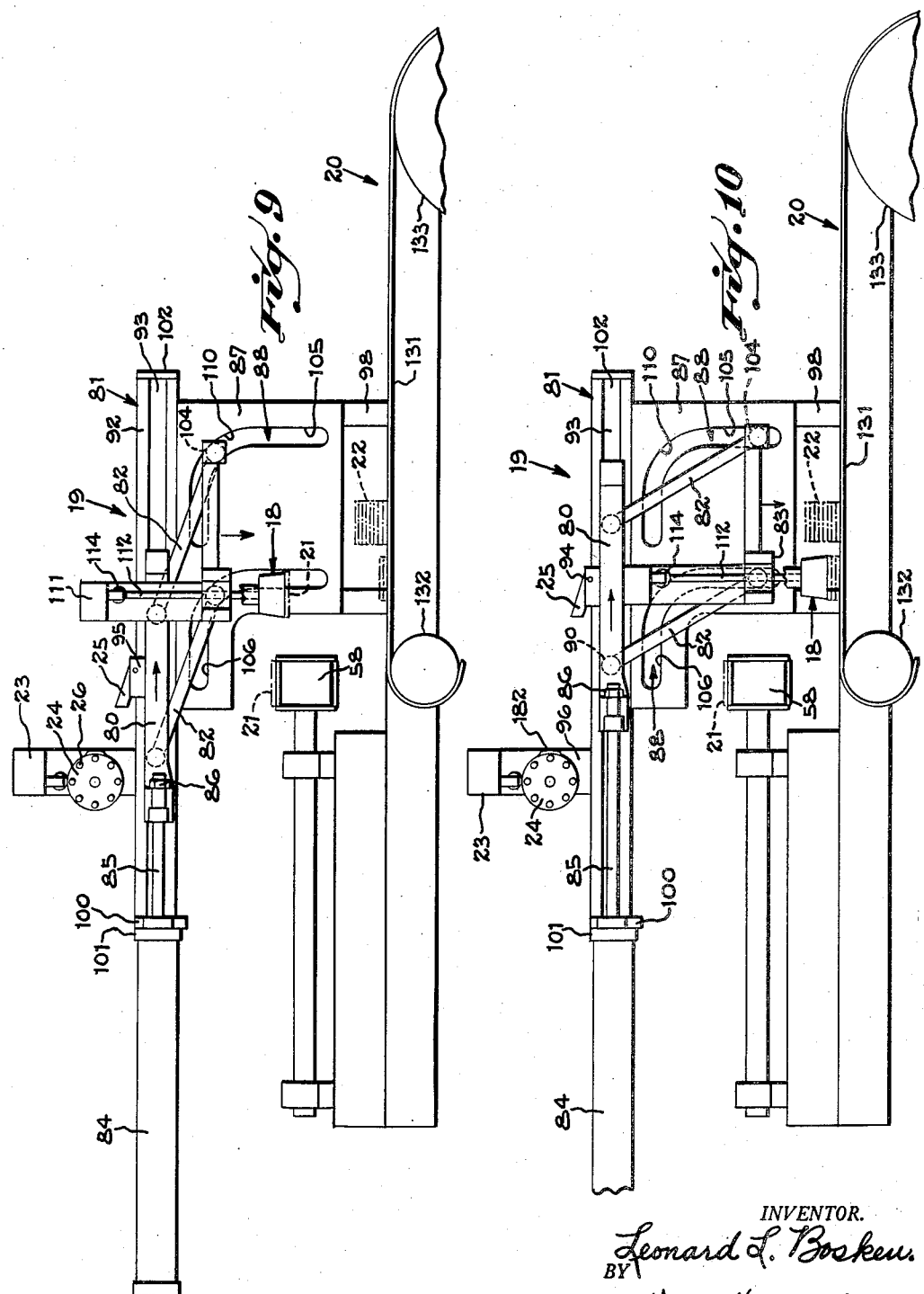

May 6, 1958 L. L. BOSKEN 2,833,426
AUTOMATIC TRANSFER APPARATUS
Filed July 19, 1952 8 Sheets-Sheet 5
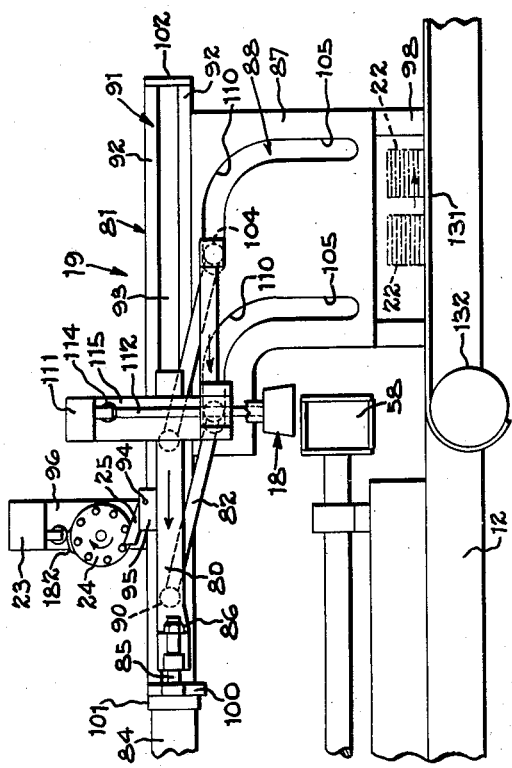
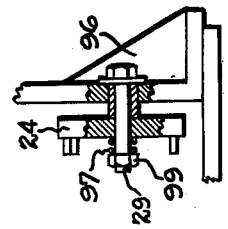
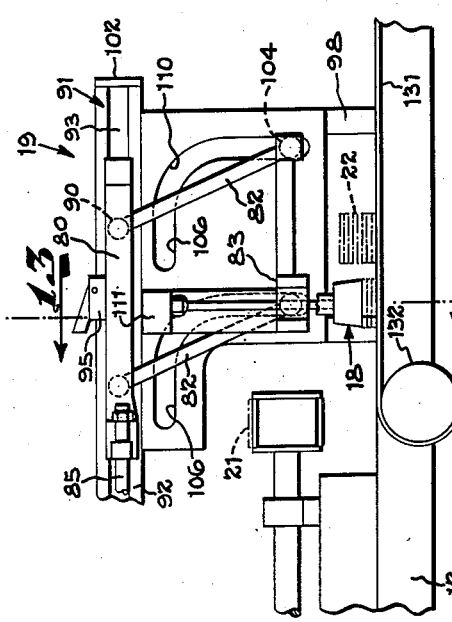
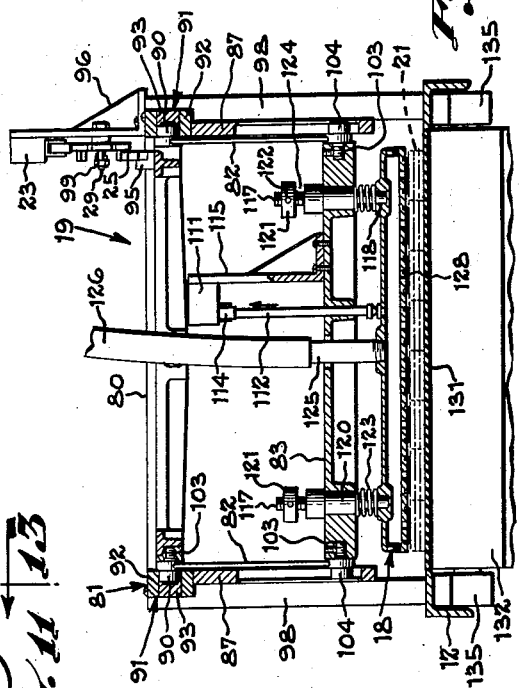
INVENTOR.
Leonard L. Bosken
BY
Wood, Herron & Evans
ATTORNEYS.

INVENTOR.
Leonard L. Bosken.
BY
Wood, Herron & Evans.
ATTORNEYS.

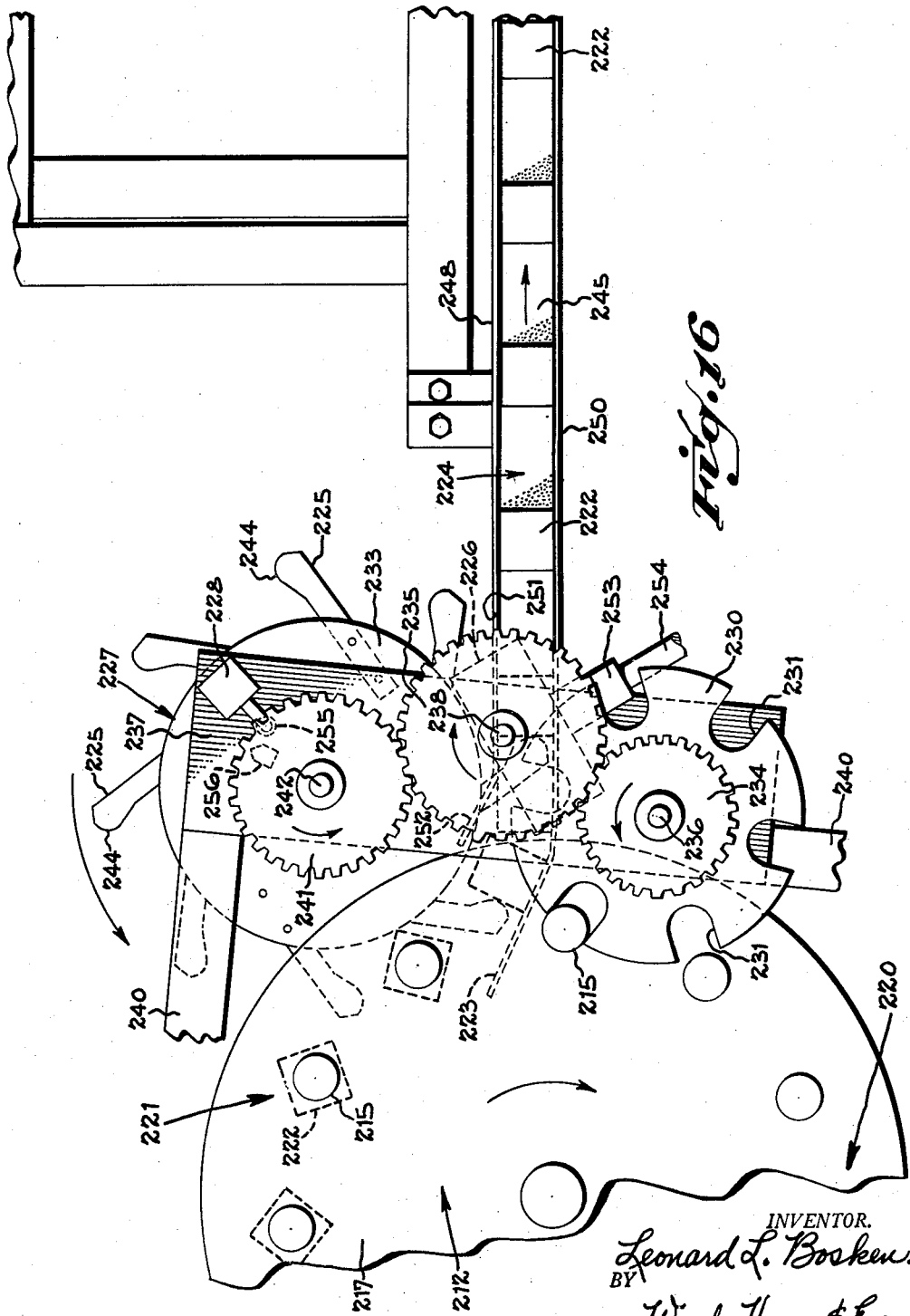

May 6, 1958 L. L. BOSKEN 2,833,426
AUTOMATIC TRANSFER APPARATUS
Filed July 19, 1952 8 Sheets-Sheet 8

INVENTOR.
Leonard L. Bosken.
BY Wood, Herron & Evans.
ATTORNEYS.

United States Patent Office 2,833,426
Patented May 6, 1958

2,833,426
AUTOMATIC TRANSFER APPARATUS

Leonard L. Bosken, Cincinnati, Ohio, assignor to Cambridge Tile Manufacturing Company, Cincinnati, Ohio, a corporation of Ohio Application July 19, 1952, Serial No. 299,880

14 Claims. (Cl. 214—6)

This invention relates generally to an apparatus for the mechanical handling of tile pieces, ceramic ware, glass ware and other articles of fragile nature which are transported upon conveyors. The apparatus is intended particularly for receiving and stacking tile pieces as they flow in a line upon a conveyor, the individual tile pieces being formed into rows, then transferred from the conveyor and deposited in rows one upon another in orderly stacks in a reliable automatic manner. The invention is also adapted to unstack tile pieces and similar flat articles by reversing the order of operation, whereby the individual articles are removed from stacks and advanced from the transfer mechanism in row formation.

The present apparatus is particularly adapted to handle flat tile pieces since the manual transfer and stacking of such articles is tedious and involves a great deal of time. Tile pieces of this type are produced at a rapid rate upon automatic tile presses and, in many instances, are advanced directly to the transfer mechanism for stacking. The transfer mechanism of this invention is capable of rapid operation corresponding to the production rate of the tile press and is disclosed in such utility as a preferred embodiment.

An apparatus adapted to stack or unstack tiles and other ware pieces is disclosed in the copending application of Charles A. Skinner, Serial No. 27,138, filed May 14, 1948, now Patent No. 2,677,471. This apparatus is mechanically connected to a conveyor system so as to operate in synchronism with it to transfer the tiles from the conveyor and deposit them upon another conveyor or support surface in individual stacks.

One of the objects of the present invention has been to provide an apparatus which operates in response to the flow of tile pieces as they issue from the tile press so as to form them into rows and stack the rows one upon another. In this respect the apparatus is self-contained, being driven continuously by an electric motor and executing its cycles of operation in response to the advancement of the individual tile pieces. In other words, the present transfer mechanism may be said to operate, at least indirectly, in time with the tile production machines, thus providing exceptional flexibility in operation and adaptablity in respect to its installation.

A further object has been to provide an apparatus which transfers tile pieces in multiples arranged in orderly row formation upon each cycle of operation so that the stacked tiles consist of horizontal rows stacked one upon another as distinguished from individual stacks of tiles as disclosed in the copending application. Handling the tiles in rows naturally increases the capacity of the machine per cycle with respect to the number of individual tiles transferred and stacked; moreover, the tiles, when stacked in row formation, eliminate other handling operations and render far more convenient and rapid the loading of racks, cartons and other receptacles, depending upon the operation to which the apparatus is applied.

In its preferred embodiment, the apparatus receives the individual tile pieces from the tile press or the discharge end of a conveyor, advances them at a predetermined spacing with respect to one another in order that they may actuate a counting device, then reassembles them end-to-end in solid rows. After being counted and formed into a solid row, the apparatus engages the row and transfers it laterally to a stacking surface or conveyor. The apparatus operates through successive transfer cycles in response to the advancement of the counting device which initiates each transfer cycle as the predetermined number of tile pieces is arranged in the row for transfer and stacking. The transfer cycles are repeated, row upon row, until the stack is built up to a predetermined number of rows or courses one upon another.

In addition to the stacking of the successive rows, the stacks are built up successively alongside one another for convenience in handling by utilizing a stack conveyor which is advanced stepwise upon completion of each stack. In other words, the stepwise advancement causes each successive stack to be deposited upon the conveyor surface adjacent the last deposited stack. The stepwise advancement of the stack conveyor is regulated by a second counting device which is actuated stepwise as each row is transferred, so as to count the number of rows of tiles deposited upon one another, thereby causing the conveyor to advance when a stack consisting of a predetermined number of rows or courses is deposited upon it.

Generally described, the transfer apparatus comprises a receiving conveyor which advances the tile pieces as they are discharged at random from the tile press or main conveyor, the receiving conveyor being adapted to pack the tiles in solid rows and to feed the tiles in this relationship to a positioning conveyor. The receiving conveyor advances constantly at a given speed and the positioning conveyor advances at a greater speed, causing the packed row of tiles to be picked up at spaced intervals for advancement toward a stacking mechanism. During advancement on the positioning conveyor, the spaced tiles intercept a light beam causing intermittent operation of a photo-electric unit which counts the individual tiles as they are advanced and reformed into a solid row containing a predetermined number of tiles.

The stacking mechanism includes an elongated suction manifold adapted to engage the packed row of tiles, the individual tiles, after being counted, being brought to a stop in end-to-end engagement beneath the manifold in position for engagement. After the required number of tile pieces has passed the photo-electric unit, a transfer cycle is initiated, causing the application of vacuum to the manifold to engage the row of tiles. After engagement of the tiles, the stacking mechanism is effective to shift the manifold transversely with the tiles engaged upon it for deposit upon the stack conveyor or surface. Upon deposit of the row of tiles, the manifold releases them and returns to its starting position ready for the next cycle.

In the tile industry it has been the customary practice to transfer and stack the tile pieces by hand since the brittle nature of the ware causes it to be cracked and chipped easily. The tile pieces are stacked in orderly arrangement for space conservation at various stages of manufacture; for example, unfinished tiles may be stacked in racks for firing. On the other hand, the finished tiles have been stacked by hand in cartons or boxes for shipment.

By operation of the present apparatus, the unfinished tiles may be deposited directly into the firing racks or the like and the finished tiles may be deposited directly into their shipping cartons without any manual operations in either case. In order to deposit the tiles into receptacles, the suction manifold establishes a surface engagement with the tile pieces, then moves in a horizontal plane for a sufficient distance to clear the positioning conveyor, then downwardly in a vertical plane into the receptacle until the row is in contact with the bottom of it. The manifold then releases the row by relieving the vacuum or by applying a positive pressure before the manifold is withdrawn from the receptacle.

Since the apparatus is self-contained and is responsive only to the advancement of the tile pieces, it is capable of being installed at one or several points along a primary conveyor without any driving connection with the conveyor. In its preferred form, the stacking mechanism is driven by a fluid pressure cylinder, with an electrical control system energizing the cylinder in response to the tile count of the photo-electric unit. This arrangement provides rapid operation so that the tiles are transferred and stacked at the maximum speed of the production machines. If the tiles are advanced to the apparatus at a slower rate, the transfer machine will automatically adjust its cycles to the slower rate by operation of the tile counting apparatus.

As explained later, the transfer apparatus is also adapted to count the tiles in response to the operation of the tile press, thus omitting the photo-electric unit. For this purpose, a counting switch is mechanically connected to the press and is electrically connected to the control system of the transfer mechanism. The switch is arranged to be tripped when a predetermined number of tiles has been advanced to the manifold so as to initiate the transfer cycle in the same manner as practiced with the photo-electric unit.

Various other features and advantages of the invention will be apparent to those skilled in the art from the detailed description in conjunction with the drawings.

In the drawings:

Figure 1 is a side elevation of the machine illustrating the general relationship of its parts.

Figure 2 is a top plan view as projected from Figure 1.

Figure 3 is a diagrammatic view taken along line 3—3, Figure 2, illustrating the driving system for the conveyors and rotary brushes.

Figure 4 is a fragmentary side elevation as viewed along the line 4—4, Figure 1, illustrating the air cylinder drive for advancing the stack conveyor.

Figure 5 is a sectional view taken along line 5—5, Figure 1, detailing the actuating mechanism of the pick-up manifold.

Figure 6 is a sectional view taken along line 6—6, Figure 5, further detailing the manifold apparatus and its relationship to the tile positioning conveyor.

Figure 7 is an enlarged fragmentary view taken from Figure 6, further detailing the structure of the manifold.

Figure 8 is an enlarged fragmentary top plan view taken from Figure 2, detailing the portion of the tile conveyor at the rotary brushes.

Figure 9 is a diagrammatic view similar to Figure 5, illustrating the movement of the stacking mechanism during the first portion of its cycle, with a row of tile pieces gripped by the manifold for transfer from the positioning conveyor to the stack conveyor.

Figure 10 is a view similar to Figure 9, showing the stacking mechanism in advanced position, with the tiles in contact with the stack conveyor.

Figure 11 is a view similar to Figure 10, illustrating the dwell or overtravel of the stacking mechanism during which the tile pieces are released from the manifold and the return stroke is initiated.

Figure 12 illustrates the transfer mechanism during its return stroke and also shows the stack completed and the stack conveyor advanced to receive the next stack.

Figure 13 is a sectional view taken along line 13—13, Figure 11, showing the overtravel of the manifold during the dwell period.

Figure 15 is an enlarged fragmentary sectional view detailing the spring loaded friction brake of the microswitch cam wheel.

Figure 16 is an enlarged fragmentary top plan view of a modified structure consisting of a sweep arm and tile counting mechanism, and showing a portion of a tile press with which the mechanism is synchronized.

*General arrangement*

Figure 14:
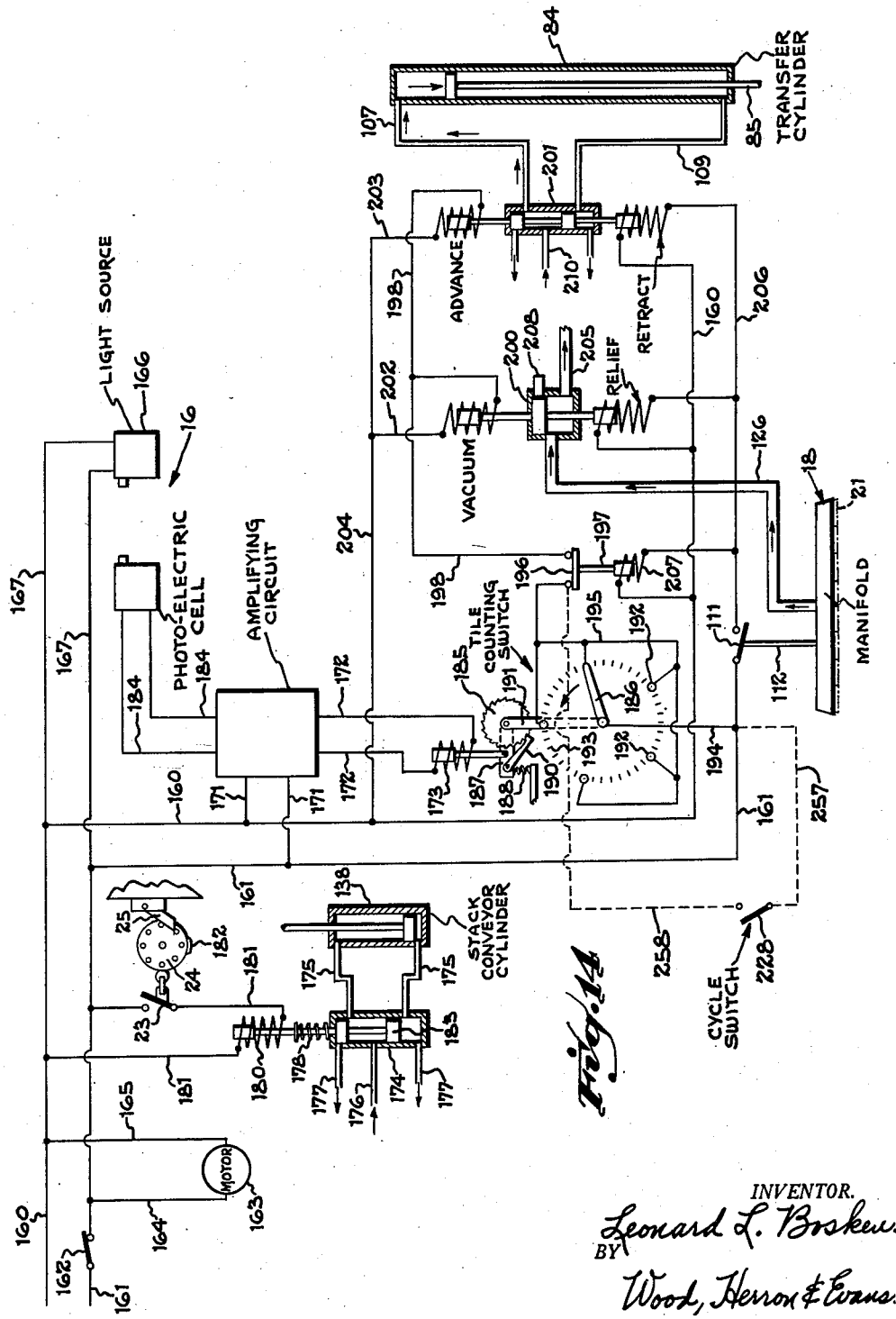
Figure 14 is a diagrammatic view of the electrical circuit and related air valves and cylinders which form a part of the control system.

Described generally with reference to Figures 1 and 2, the various parts of the machine are mounted upon a frame indicated at 10, which is constructed preferably of structural steel members including vertical legs 11 and a horizontal top frame indicated at 12. As viewed from above as in Figure 2, the top frame is generally L-shaped corresponding to the right angular relationship of the conveyor runs as described later.

As explained above, the transfer machine is intended for the rapid automatic handling of various articles and is of particular utility in the tile industry in stacking or unstacking individual tile pieces for firing or further processing. As a preferred embodiment therefore, the machine is disclosed in relation to the transfer and stacking of tile pieces as they advance at random upon a main conveyor system. This operation may be performed at one or more stages of manufacture, and the machines are installed at the discharge ends of the conveyors where needed.

In the case of freshly formed tiles, by way of example tile pieces may be stacked and transported from the transfer machine to other equipment for finishing or firing; in handling finished tiles, the tiles may be stacked directly in cartons for shipment. If necessary, the freshly formed tile pieces may be deposited directly in racks for convenience in handling although for purposes of illustration, the racks have been omitted from the present disclosure.

As best shown in Figure 1, the tile pieces flow from the pressing machines or other equipment upon the main conveyor 13 and the transfer machine is equipped with a receiving conveyor, generally indicated at 14, arranged to receive and advance the tile pieces through the transfer machine. The receiving conveyor as explained later, receives the tile pieces advancing in a line on the main conveyor and transfers them to a tile positioning conveyor 15, which is adapted to arrange the tiles in an orderly row.

Upon transfer to the positioning conveyor, the individual tiles assume a spaced relationship with respect to one another so that the spaced tiles may be counted as they intercept the light beam of a photo-electric unit which is indicated generally at 16. Near the end of the positioning conveyor, the tiles are arrested by a stationary stop element 17 which is secured to the rail in a position to extend across the belt as shown in Figure 6. Thus, the individual tile pieces advancing in a line on the positioning conveyor, are sequentially stopped while the conveyor continues its advancement with respect to them. This causes the tile pieces to be packed collectively in end-to-end engagement to form a row beneath the vacuum manifold indicated generally at 18.

The conveyor arrangement so far described is effective to arrange the random tile pieces in orderly rows and the vacuum manifold is adapted to grip the row when vacuum is applied to it. Thereafter, the row is shifted transversely from the positioning conveyor by the manifold and deposited upon the stack conveyor. The operation is repeated each time a row is accumulated, and the rows are thus deposited on upon another to the required height of the stack.

As described in further detail later, the photo-electric unit counts the individual tiles advancing at random upon the positioning conveyor before they reach the stop 17. When a pre-selected number of tile pieces has been advanced to a pickup position beneath the manifold as explained above, the photo-electric unit energizes a control system which is effective to apply vacuum to the manifold, causing engagement of the row of tile pieces. The manifold is next shifted transversely with the tiles engaged upon it, then downwardly to stacking surface where the tile pieces are released. The stacking mechanism for actuating the manifold is indicated generally at 19 in Figures 1 and 2, and the movements imparted to the manifold are illustrated in Figures 9 to 13.

The stacking mechanism normally maintains the manifold in stationary position above the trailing portion of the positioning conveyor as shown in Figure 5. As described later, the bottom of the manifold, which is presented toward the conveyor surface, is provided with a series of suction holes, one for each tile piece of the row. In the pickup position shown, the bottom of the manifold is sustained above the surface of the positioning conveyor a distance just sufficient to allow the tile pieces to pass under it so that upon application of vacuum, the tile pieces will be gripped by the manifold. Thus, when a cycle of operation is initiated by the photo-electric unit, the tile pieces are first gripped by the manifold and thereafter the stacking mechanism executes the cycle of operation, moving the manifold and the tile pieces from the position shown in Figure 5, and continuing through the movements illustrated in Figures 9 to 12 to transport the tile pieces to the stacking surface.

As noted above, the rows may be deposited directly in firing racks if they are freshly formed or they may be deposited in shipping cartons if they are in finished condition. In this latter event, the racks or cartons may be placed upon a stationary stacking surface so that the manifold may descend vertically and deposit the successive rows in them without further handling.

In the present disclosure, however, the stacks are built up successively upon a stack conveyor indicated generally at 20 which is adapted to advance intermittently as each stack is built up to its predetermined height. Cartons or racks adapted to contain multiple parallel stacks may be placed upon the stack conevyor so that they will be advanced for reception of the successive stacks. On the other hand, the stacks may be built up directly upon the surface of the stack conveyor for further handling as disclosed in the drawings. The stack conveyor is provided with a driving system which responds to the number of reciprocations of the stacking mechanism to cause a stepwise advancement of the stack conveyor after a predetermined number of reciprocations of the manifold.

As best shown in Figure 2, the stack conveyor extends at right angles to the positioning conveyor and its upper surface is disposed in a plane lower than the plane of the positioning conveyor. Thus, each row of tiles 21 (Figure 14), which extends longitudinally of the positioning conveyor, is shifted transversely from the positioning conveyor then lowered to the stack conveyor. Successive rows are deposited one upon another until a stack containing a predetermined number of rows is built up upon the stack conveyor as indicated in Figures 9 and 10. The stack conveyor then advances for a sufficient distance to permit the next successive stack to be deposited adjacent the first stack. The previously completed stack is indicated diagrammatically at 22 in Figure 9, the stack conveyor being advanced stepwise a sufficient distance to space the stacks from one another as indicated.

In the disclosed embodiment of the invention, the apparatus is arranged to transfer rows consisting of eight tiles packed in end-to-end contact and to build up stacks consisting of eight of such rows deposited one upon another. Each cycle of operation may be divided generally into two automatic operations.

The first operation consists of counting the individual tiles by operation of the photo-electric unit as they are advanced upon the positioning conveyor to cause the cyclic operation of the stacking mechanism. In the present example, the photo-electric unit initiates the operation of the stacking mechanism as previously outlined, each time the row of eight tiles is advanced to the manifold.

The second operation consists of advancing the stack conveyor intermittently each time the stack of eight rows is deposited upon it in response to the reciprocations of the stacking mechanism in transferring the rows to the stack. For this purpose, the apparatus includes a microswitch 23 which is tripped by a cam wheel 24 upon each complete rotation of the wheel. Wheel 24 is advanced a partial turn upon each reciprocation of the stacking mechanism by means of a pawl 25 which reciprocates with the stacking mechanism. In the present example, the cam wheel includes eight pins 26 such that it is rotated one-eighth of a turn upon each reciprocation of the transfer mechanism. In order to prevent back rotation of the cam wheel upon the return stroke of the pawl, the wheel may be provided with a pawl and ratchet arranged to lock it against reverse rotation. In the present disclosure of the wheel, this structure is omitted and instead, back rotation is overcome by providing a spring loaded friction brake upon the stud 29 which supports the wheel for rotation.

From the foregoing, it will be understood that the transfer machine operates independently of the main conveyor 13, in the sense that there is no mechanical connection between the main conveor and transfer machine. In other words, the cycles of operation respond to the preselected number of tiles which are advanced to the machine from the main conveyor since the photo-electric unit 16 controls the operations of the stacking mechanism 19 in response to the number of tiles delivered from the main conveyor. The height of the stack is determined by the number of reciprocations of the transfer mechanism which is likewise independent of the main conveyor.

*Receiving and positioning conveyors*

As explained above, the tiles are advanced at random from the stamping machines upon the main conveyor 13 to the receiving conveyor 14 for controlled advancement toward the stacking mechanism. The receiving conveyor consists of an endless belt 27, preferably of rubber or equivalent material passing over a forward roller 28 and rearward roller 30. A relatively large drive roller 31 is in driving engagement upon the return run of the belt and an adjustable roller 32 maintains the belt in taut condition.

The upper run of belt 27 rests upon the web of a channel 33 which provides side rails adapted to guide the tiles in longitudinal alignment as they are advanced by the belt. The channel is secured to the framework 12 by means of the brackets 34 as shown in Figure 2. The slack adjustment roller 32 is mounted upon the framework by means of the bracket 35 which includes bolts 36 passing through slots 37 to permit vertical adjustment. The forward and rearward rollers 28 and 30 are journalled in a plate 38 which is also mounted upon the framework 12. Plate 38 is pivotally mounted upon the shaft of roller 28 so that the plate and its rollers can be adjusted vertically to bring roller 30 into alignment with conveyor 13.

The drive roller 31 is mounted for rotation upon one end of the shaft 39 which is journalled in pillow bearings 40—40 mounted upon the frame 12. Shaft 39 forms a part of a driving system which also drives the positioning conveyor as explained later. It should be noted at this point that the receiving conveyor 14 is driven preferably at a speed greater than the main conveyor 13 in order to insure an even flow of tile pieces at the maximum output of the main conveyor.

It will be observed that the tiles resting upon the receiving conveyor 14 are engaged by an idler roller 41 which is poised above the conveyor belt in a position to frictionally engage the passing tile pieces. Roller 41 is provided with a resilient tread 42 preferably of rubber to prevent damage to the upper surface of the tiles. In order to permit vertical movement, roller 41 is rotatably journalled upon the free end of an arm 43, which has its opposite end pivotally mounted as at 44 upon a lug 45 secured to the frame 12. In passing beneath the roller, the tile pieces are frictionally engaged under the weight load of the roller upon the surface of the rubber belt. This provides positive advancement of the tile pieces between the rotary cleaning brushes 46 and 47 to the positioning conveyor 15.

As best shown in Figures 1 and 2, the channel 33 includes an opening 48 to provide clearance for the upper run of the belt at the roller, and across the opening there is provided a pair of rails 50—50 which are located in the same horizontal plane as the upper surface of the belt 27 so that the tile pieces may slide without interference from the belt to the rails. The tile pieces are packed in end-to-end engagement as they advance across the rails by the restraining action of the rotating brushes 46 and 47. As the pieces advance lineally across the rails, their upper and lower surfaces are swept clean of loose powdered clay by the brushes. It is to be noted that the upper cleaning brush rotates in a direction counter to the advancing tile pieces.

The upper brush 46 is mounted upon the end of a shaft 51 which is journalled in a bearing 52 secured by angle brackets 53 to the frame 12 (Figure 2). The shaft is driven as part of the driving system of the conveyors as explained in detail later.

As detailed in Figure 8, the opening 48 is located at the point of tangency of the brushes 46 and 47 to expose the bottom surfaces of the tile pieces to the lower cleaning brush 47. The rails 50—50 are supported upon cross braces 54—54 located on opposite sides of the tangential portion of the brushes. The cross braces have their outer ends fastened to the side rails of the channel for support. The lower brush is mounted upon a shaft 55 which is journalled in a bearing (not shown) similar to the upper brush bearing. Shaft 55 is driven in common with the shaft of the upper brush as explained later.

As indicated in Figure 1, the conveyor channel 33, except for the interruptions noted above, extends continuously from the receiving conveyor to the stacking mechanism and serves both the receiving and positioning conveyors. The positioning conveyor consists of a flat belt 56 preferably formed of rubber or equivalent material passing over the conveyor rollers 57 and 58. The upper surface of belt 56 is in the same plane as the web 50, there being provided an opening 60 adjacent roller 57 to provide clearance.

Roller 57 is driven in the direction indicated in Figure 1 by means of a drive shaft 61 which is journalled in pillow bearings 62—62 fastened upon frame 12. The driving system for the two conveyors and cleaning brushes is best shown in Figures 2 and 3. The system may be powered by an electric motor (not shown), or as explained later, it may be connected to conveyor 13 or to the drive of a tile press. A sprocket chain 63 is in driving connection with a driving sprocket and passes about a sprocket 64 which is fixed upon a shaft 65. A speed reduction pinion 66 is keyed upon shaft 65 and meshes with a gear 67 keyed upon the shaft 39, the arrangement being adapted to rotate roller 31 and advance the receiving conveyor 14, shown in broken lines, at a reduced rate of speed. From shaft 39 the drive is extended to the positioning conveyor and cleaning brushes by means of sprocket chains.

To drive the cleaning brushes, a sprocket 68 (Figure 2) is fixed upon shaft 39 and a sprocket chain 70 passes around the sprocket and extends over the sprocket 71 which is secured upon the shaft 51 of the upper cleaning brush. From sprocket 71 the chain passes downwardly about the sprocket 72 which is fixed upon the shaft 55 of the lower cleaning brush. By this arrangement both brushes are driven in the direction indicated in Figure 3. After passing around sprocket 72, the chain continues around the idler pulley 73 which regulates the slack of the chain. The upper and lower cleaning brushes are indicated in broken lines in Figure 3.

The drive from shaft 39 extends to the drive shaft 61 of the positioning conveyor by way of the sprocket chain 74. This chain passes around the sprocket wheel 75 fixed upon shaft 39 and around the sprocket wheel 76 fixed upon shaft 61 of the positioning conveyor. Chain 74 drives the positioning conveyor, which is indicated in broken lines, in the same direction as the receiving conveyor, but at a higher rate of speed as determined by the relative diameters of the sprocket wheels 75 and 76. The speed differential is effective to space the tiles from one another as they pass upon the positioning conveyor for advancement to the transfer mechanism.

In the present disclosure as noted above, the photoelectric unit 16 is adapted to count the spaced tile pieces as they are advanced lineally upon the positioning conveyor toward the transfer apparatus in order to initiate the transfer cycles in response to the passage of the preselected number of tiles. The photoelectric unit consists of a light source and a photoelectric cell of the usual type providing a light beam which is intercepted by the passing tile pieces. As shown in Figure 1, the side rail of the conveyor channel includes an opening 77 to permit passage of the light beam, the two units being angularly related to the plane of the conveyor so that the corner of each tile piece will intercept the angularly related light beam as the tile piece passes the opening.

It will be understood that the tile pieces must be spaced individually upon the surface of the positioning conveyor in order that the light beam may pass to the photo-cell intermittently as the spaced tile pieces intercept the beam. The greater lineal speed of the positioning conveyor provides this spacing as explained earlier.

As previously noted, the positioning conveyor includes a stop element 17 which is located at the trailing end of the conveyor adjacent the end of the suction manifold 18. Stop 17 is spaced slightly above the surface of belt 56 to provide clearance and is adapted to arrest the tile pieces so that they are packed in end-to-end engagement with one another beneath the manifold. It is to be understood at this point, that the receiving and positioning conveyors are driven continuously during operation of the machine, consequently, the positioning conveyor continues to advance with respect to the arrested tile pieces after they engage the stop 17. The stop thus provides a transfer station in that it holds the tile pieces stationary in a position to be gripped by the manifold upon application of vacuum.

As shown in Figure 6, the manifold 18 is provided with eight pickup apertures and the control system which is interconnected with the photo-electric unit 16, is adapted to initiate a transfer or stacking cycle after eight tile pieces have been counted by the photoelectric unit and positioned against the stop beneath the manifold. It will be apparent, however, that the number of tile pieces may be varied according to requirements by providing suitable manifolds and making appropriate changes in the control system. According to the present disclosure, it will be understood that upon passage of the eighth tile piece to the suction manifold, the control system will initiate the stacking cycle, which includes the steps of applying vacuum to the manifold and shifting the manifold through its path of movement by operation of the stacking mechanism as explained below.

*Stacking mechanism*

As illustrated diagrammatically in Figures 9 to 12, the stacking mechanism 19 shifts the successive rows of tile pieces laterally from the transfer station of the positioning conveyor 15 and deposits the pieces in row formation upon the stack conveyor 20 by reciprocation of the manifold 18 in a generally rectilinear path of movement. In general the mechanism consists of a cross head 80 movable in a horizontal plane relative to a cross head guide 81 and connected by two pairs of parallel links 82—82 to a manifold carriage 83. The cross head is reciprocated by an air cylinder 84 having a piston rod 85 connected to the cross head as at 86.

The manifold carriage is guided in its path of movement by means of the spaced carriage guideway plates 87—87 which include the tracking slots 88 for guiding the carriage in its horizontal and vertical path. As previously explained, the cross head carries the pawl 25 which advances the cam wheel 24 upon each reciprocation in order to advance the stack conveyor 20 one step for each completed stack of tile pieces 22.

Described with reference to Figures 2, 6 and 9, the cross head 80 consists of a rectangular frame having along its opposite side edges respective guide rollers 90—90. The cross head guide 81 consists of a pair of tracks 91—91 spaced from one another in the horizontal plane and loosely confining the rollers on opposite sides. The tracks 91 each consist of a pair of bars 92—92 (Figure 13) parallel to one another and joined by an intermediate spacer bar 93 to provide an inwardly facing channel confining the rollers 90.

As shown in Figure 12, the pawl 25 is pivotally mounted as at 94 in a block 95 on the cross head and is urged in the elevated position by a spring (not shown). The cam wheel 24 and switch 23 are both mounted upon an angle bracket 96 (Figure 13) secured to the cross head guide in a position to be actuated by the pawl. As detailed in Figure 15, back rotation of the cam wheel is resisted by the friction brake consisting of a spring 97 on stud 29, held under compression between the wheel and a nut 99.

The respective tracks 91 are mounted upon the upper edges of the carriage guide plates 87—87 which make up the carriage guideway. The respective plates 87 in turn are mounted upon standards 98—98 rising from the frame 12. As best shown in Figure 5, the assembled guide structure overhangs the positioning conveyor in cantilever fashion, the air cylinder 84 being attached to the overhanging end of the structure.

For mounting the air cylinder, a cross bar 100 (Figures 2 and 5) extends transversely across the free ends of the tracks 91—91, the cylinder being secured to the intermediate portion of the bar as indicated at 101 in Figure 5. The opposite ends of the tracks are tied together in spaced relationship by a similar cross bar 102 as shown in Figures 2 and 5.

As detailed in Figure 13, the cross head rollers 90 are four in number, each roller being loosely journalled upon a stud 103, each stud also providing a pivot bearing for the upper ends of the parallel links 82. The lower ends of the links are in a similar manner pivotally connected to the studs 103 of the manifold carriage rollers 104 as shown.

Referring to Figures 5 and 10, it will be noted that the longitudinal spacing of the carriage rollers 104 corresponds to the spacing of the vertical portion 105 of the carriage guide slots.

The cross head rollers 90 are spaced longitudinally a corresponding distance so that the links 82 swing in parallelism with one another during the cycle of movement. Thus at the start of the cycle (Figure 5) the carriage is maintained in horizontal position by the horizontal portion 106 of the guide slots and during its movement, it is sustained in level position by operation of the parallel links 82.

The horizontal portion of the guide slot sustains the pickup manifold at a predetermined elevation with respect to the positioning conveyor while the tile pieces are advanced to pickup position beneath it. The relationship is such that the bottom of the manifold is spaced above the conveyor surface sufficiently to allow the tile pieces to advance beneath it, but sufficiently close to allow the manifold to grip the tile pieces by suction when vacuum is applied.

When the eighth tile piece has advanced lineally to the pickup position beneath the manifold, the control system is effective to apply vacuum to the manifold and to apply air pressure to the rearward end of cylinder 84 by way of the conduit 107 (Figure 2), causing the piston rod and cross head to move toward the right as viewed in Figure 5. This causes the manifold to be shifted transversely with respect to the positioning conveyor, causing the tile pieces to be transferred from the conveyor. It will be noted in Figure 5, that the guide plate on the right hand side of the conveyor extends only to the bottom surface of the tiles as at 108 to permit them to be shifted without interference.

The horizontal movement of the manifold carriage toward the right continues until the carriage rollers 104 encounter the curved portion 110 of the guide slots as shown in Figure 9, causing the carriage, while still maintained in a horizontal plane, to move in a correspondingly curved path and thereafter to continue in a vertical path as the rollers track in the vertical portion 105 of the guide slots (Figure 10).

The vertical portions of the slots are sufficiently long to allow the manifold to descend to the surface of the stack conveyor so that the tile pieces may be deposited gently upon the conveyor surface and then disengaged from the manifold by relieving the suction. It will be observed that as the successive rows of tile pieces are deposited one upon the other to make up the stack indicated at 22 in Figure 11, the downward stroke of the manifold decreases progressively as the height of the stack increases. This change in elevation is accommodated by providing a floating connection between the manifold and the carriage which supports it. The arrangement is such that the manifold may rest upon the stacked tiles to provide a dwell period while the carriage itself continues moving downwardly for a controlled distance toward the stationary manifold.

This limited overtravel is utilized to actuate a control switch 111 (Figure 6), preferably of the micro-switch type, which is interconnected in the control system and adapted to reverse the travel of the carriage upon being tripped. The switch 111 is tripped by a vertical actuating stem 112 passing slidably through the carriage, having its lower end in contact with the manifold as at 113 and having its upper end in contact with the operating stem 114 of the switch. The switch is mounted upon an angle bracket 115 which is secured by screws 116 to the upper surface of the carriage. When the manifold engages the top of the stack as indicated in Figure 11, continued downward movement of the carriage will cause the switch plunger 114 to be depressed by the stem 112. The switch is interconnected in the control system to supply air to cylinder 84, by way of conduit 109 (Figure 2), thus reversing the movement of the carriage when the switch is tripped. This operation is described in detail later in conjunction with the control system illustrated in Figure 14.

As shown in Figures 6 and 13, the floating connection for the pickup manifold consists of a pair of spaced studs 117—117 having their lower ends fastened as at 118—118 to the top wall of the manifold. The carriage is provided with a pair of spaced bushings 120—120 slidably confining the studs 117 to provide vertical movement of the manifold with respect to the carriage. In the position shown in Figure 6, the manifold is suspended from the carriage by the studs which are provided for this purpose with adjustable collars 121—121 threaded upon their upper ends and locked in adjusted position by the set screws 122—122.

Respective compression springs 123—123 surrounding the studs are interposed between the bottom of the carriage and the manifold. The springs 123 are slightly preloaded to exert a predetermined initial pressure and to maintain the manifold normally in the position shown in Figure 6. Upon engaging the stack (Figure 13), the carriage overtravel compresses the springs approximately the distance indicated by the clearance 124 between the bushings and collars.

Vacuum is supplied and released with respect to the manifold by means of the pipe 125 threaded into its upper wall and connected to a source of vacuum by means of the flexible conduit 126 (Figures 6 and 13). As later described, there is provided a control valve for supplying and relieving the vacuum with respect to the conduit 126.

As best shown in Figure 7, the bottom wall 127 of the manifold is provided with a series of suction holes 128, in the present instance eight in number, one hole being provided for each tile piece of the row. In order to establish a substantially air tight connection with the surface of the tile pieces, each aperture is surrounded by a ring 130 formed of rubber or equivalent resilient material. The rings preferably are confined in concentric grooves surrounding the suction holes and project outwardly from the bottom surface of the wall 127 so as to provide an air seal.

The stack conveyor 20 extends at right angles from the positioning conveyor as shown in Figure 2 and is slightly greater in width than the length of the pickup manifold in order to receive the rows of tile pieces in transverse position. As indicated in Figure 5, the stack conveyor comprises an endless belt 131 passing over the rollers 132 and 133. Roller 132 is an idler roller, being mounted upon a shaft 134 which is loosely journalled in bearing blocks 135—135 mounted upon the frame 12.

The roller 133, which drives the conveyor, is mounted upon a shaft 136 which in turn is journalled in bearing blocks 137—137 mounted upon the legs 11 of the frame 10 as shown in Figure 1. Roller 133 is advanced intermittently by operation of the switch 23 in response to rotation of cam wheel 24 as each stack is built up upon the conveyor surface. Drive roller 133 is driven by an air cylinder 138 (Figure 4) adapted to provide stepwise advancement of a ratchet wheel 140 which is fastened upon the shaft 136 of the roller. Air pressure is supplied to cylinder 138 in a direction to advance the roller each time the ratchet wheel actuates the switch 23 as described in detail later with reference to the control system. It will be understood at this point, that as each complete stack is deposited, the conveyor is advanced as shown in Figure 12 a sufficient distance to space the stacks from one another as shown. This advancement is determined by the stroke of the piston rod 141 of cylinder 138.

Described with reference to Figures 1 and 4, the piston rod 141 of cylinder 138 is pivotally connected as at 142 to a swinging arm 143, having an end pivotally mounted upon shaft 136. A pawl 144 has an end pivotally connected to the swinging end of arm 143 as at 145, the swinging end of the pawl being engageable with the teeth 146 of the ratchet wheel. Thus, upon upward movement of the piston rod, the ratchet wheel and conveyor roller 133, are rotated in the direction indicated by the arrow in Figure 5, causing advancement of the conveyor. Upon downward movement of the piston rod, the pawl is retracted while the roller 133 remains stationary. In order to compensate for the angular movement of the arm 143 during its swinging movement, the lower end of cylinder 138 is pivotally mounted upon a lug 147 which is connected to one of the legs 11 as shown in Figure 1.

In order to dislodge any dust or tile particles which may be deposited on the stack conveyor, there is provided a stationary brush 148 engaged against the lower run of the conveyor belt. Brush 148 is mounted upon a cross bar 150 having its opposite ends secured to the legs 11 as best shown in Figure 1.

The various components of the control system are enclosed in the cabinet indicated at 151 in Figure 1 and are disclosed diagrammatically in Figure 14. There is also provided a vacuum tank 152 in connection with the vacuum conduit 126 which serves as an accumulator. When the control valve opens to apply vacuum to the manifold, the tank produces a sudden vacuum surge which is effective to establish a firm suction grip upon the tile pieces.

Control system

The simplified electrical circuit illustrated in Figure 14 represents a typical arrangement suitable to regulate the machine. As shown, the entire system is powered by the main lines 160 and 161, a main control switch 162 being interposed in one of the lines. In general the control system includes two sections, the first being a circuit for progressively advancing the stack conveyor in response to the reciprocations of the transfer mechanism, the second section being under the control of the photo-electric unit 16, to actuate the transfer mechanism in response to the number of tile pieces advanced lineally by the positioning conveyor to the manifold. The stack conveyor circuit in a sense operates independently of the photo-electric circuit since it merely advances the stack conveyor when the respective stacks are completed, while the photo-electric circuit is operated in response to the actual advancement of the individual tiles upon the positioning conveyor.

As shown, the motor 163, which drives both the receiving and positioning conveyors, is connected by way of the lines 164 and 165 to the power lines 160 and 161 such that the motor is energized continuously when switch 162 is closed to place the system in operation. The light source 166 of the photo-electric unit is connected by way of branch lines 167—167 to the main lines, thus energizing the light source continuously when the system is energized.

The photo-electric unit includes an amplifying circuit which is also powered by the lines 160 and 161 through the branch lines 171—171. The amplifying circuit is conventional in design and for purposes of simplicity, is illustrated in the diagram in block form. Lines 172—172 connect the amplifying circuit to a solenoid 173, which, as described later, is effective to advance a tile counting switch in response to the tile count of the photo-electric unit.

Referring to the stack conveyor circuit, the advancements of the conveyor cylinder 138 are regulated by the cam wheel 24 which is advanced in stepwise fashion by the pawl 25 in response to the reciprocations of the stacking mechanism as explained previously. As shown, air is admitted alternately to the ends of the cylinder 138 by means of the electrically operated reversing valve 174 connected by conduits 175—175 to the opposite ends of the cylinder. Air is supplied to the valve by the conduit 176 and is exhausted from alternate ends of the cylinder by way of the exhaust conduits 177—177. In the valve position shown, air is admitted to the upper end of the cylinder and is exhausted from the lower end, the piston being in a position corresponding to that shown in Figure 4. The valve is normally maintained in this position by the compression spring 178 which surrounds the stem of the valve. It will be understood that the reversing valve is shown diagrammatically to illustrate its operation and in practice comprises a commercial unit.

The reversing valve 174 is shifted electrically by the solenoid winding 180 which has its opposite ends in electrical connection with the power lines 160—161 by way of the lines 181—181. The switch 23, is normally open as indicated and is inserted in one of the lines 181, so as to energize the solenoid winding 180 when the switch is closed by the cam 182. Upon being energized, the plunger 183 of the reversing valve 174 is shifted to a position opposite from that illustrated, causing air pressure to be admitted by way of line 176 through the valve to the lower end of the cylinder 138. This causes the piston to rise, thereby causing a stepwise advancement of the stack conveyor in the direction indicated by the arrow in Figure 5. The piston remains elevated until the cam wheel 24 is advanced, the next step causing switch 23 to open. This deenergizes the electrically operated valve, causing it to be shifted back to the position shown and causing the piston to be lowered to a position in readiness for the next advancement.

From the foregoing, it will be understood that the stack conveyor is advanced intermittently in response to the reciprocations of the stacking mechanism, but independently of the photo-electric counter which regulates the stacking mechanism. Otherwise stated, the stack conveyor cycles are dependent upon the operation of the transfer mechanism and therefore, indirectly dependent upon the photo-electric unit.

The photo-electric cell indicated diagrammatically in the electrical circuit is a conventional unit and is connected to the amplifying circuit by way of the lines 184—184. The electrical impulses, which are generated by the cell in response to the passing tiles, are amplified in the customary manner and the amplified impulses are conducted to the winding of solenoid 173 which actuates the tile counting switch. The circuit is arranged to reciprocate the solenoid plunger once upon passage of each individual tile, the solenoid being arranged to advance in stepwise fashion a ratchet wheel 185 which, as shown diagrammatically, is in driving connection with the blade 186 of the tile counting switch.

As shown, the plunger of solenoid 173 is pivotally connected to an arm 187 which is spring loaded in the upward direction by means of a compression spring 188. A pawl 190 has one end pivotally connected to the arm 187 and its free end engages sequentially the teeth of ratchet wheel 185.

The switch blade 186 is connected by shaft 191 to the ratchet wheel for advancement in steps corresponding to the teeth of the ratchet wheel. The switch blade 186 sequentially establishes electrical contact with the several contacts 192 which are engaged by the swinging end of the blade. Since the present transfer mechanism is arranged to operate upon multiples of eight tile pieces, the blade advances in eight stepwise advancements between the respective contacts 192. These advancements are indicated by the graduations 193 of the counting switch, each graduation representing one tile piece. In operation, each tile piece causes the ratchet wheel to be advanced one tooth and this causes the switch blade to move from one contact to the next in eight intermittent advancements upon passage of eight tile pieces.

When the switch blade engages any one of the stationary contacts 192 as shown, a circuit is established from the power line 161 through branch line 194 to the switch blade and by way of the contact 192 to one of the branch lines 195. The circuit is completed through the normally closed contactor 196 of an interlock relay 197 to the line 198. Line 198 extends in common to the "vacuum" winding of the manifold control valve 200 and to the "advance" winding of the transfer cylinder control valve 201. The circuit is completed through these windings by way of the branch lines 202 and 203 to a line 204 which leads to the power line 160.

Concurrent energization of these two windings shifts both the control valves to the positions shown in the diagram, causing vacuum to be applied by way of conduit 205 to the manifold and immediately thereafter, initiating movement of the transfer cylinder in the direction indicated by the arrows in Figure 9. Immediately upon application of vacuum, the tile pieces resting upon the positioning conveyor beneath the manifold, are gripped by the manifold suction, and after a momentary delay due to air flow and inertia, the manifold and tile pieces are shifted transversely from the conveyor toward the stack conveyor as indicated.

This movement continues until the manifold reaches the tile deposit position shown in Figures 11 and 13 at which point the overtravel of the manifold trips to closed position, the switch 111. This switch is normally open and upon being closed, it relieves the vacuum for deposit of the tile pieces and also initiates the retracting movement of the stacking mechanism as explained below.

As shown, switch 111 completes the circuit from line 161 to a line 206 which is connected in common to the "relief" winding of the manifold valve and the "retract" winding of the cylinder valve. Line 206 is also connected to the winding 207 of the interlock relay 197. The opposite terminals of these three windings are connected in common to the second power line 160 so that all of the windings are energized when switch 111 is closed by the manifold overtravel. When the interlock winding 207 is energized, its normally closed contactor 196 in line 198 is opened.

Normally, the tile counting switch blade will have been advanced sufficiently by the flowing tiles to open the circuit to line 198 and deenergize the "vacuum" and "advance" windings before the manifold switch 111 energizes the "relief" and "retract" windings. The purpose of the interlock is to prevent both sets of windings from being energized at the same time in the event that the switch blade has not been advanced to open position when switch 111 is closed. In other words, even if the switch remains in closed position for lack of advancing tiles, the interlock will open the circuit to deenergize the "vacuum" and "advance" windings when the "relief" and "retract" windings are energized by the manifold switch 111.

When the manifold valve is shifted to "relief," the vacuum is cut off and atmospheric pressure is admitted by way of the port 208 through the valve to conduit 126, thus releasing the tile pieces. When the cylinder valve is shifted to "retract," air pressure is exhausted from the rearward end of the cylinder by way of conduit 107 through the valve to the exhaust port, while air pressure is conducted from the supply conduit 210, through the valve to the forward end of the cylinder by way of conduit 109. This causes the mechanism to shift the manifold back to retracted position as indicated in Figure 12. As soon as the manifold retracts, the normally open switch 111 opens and deenergizes relay 197 which is normally closed. This causes the relay to close its contactor 196 as shown, thus conditioning the circuit for the next cycle.

From the foregoing, it will be observed that each stacking cycle is initiated after intermittent energization of the photo-electric cell by advancement of the required number of tile pieces upon the positioning conveyor. During this counting period, the vacuum and cylinder valves remain in "relief" and "retract" positions with contactor 196 closed, but with the circuit open in the counting switch; therefore, the manifold remains in stationary position above the conveyor as shown in Figure 1. As soon as the rotary switch blade 186 of the counting switch engages one of the stationary contacts at the end of the counting period, the circuit is closed as explained above and remains so until the manifold cylinder valves are shifted to their second positions causing vacuum relief and reversal of manifold movement. In other words, the cycle is initiated by a tile counting switch and reversed by the overtravel switch 111 so that the travel of the manifold is determined by the height of the stack as the successive tile pieces are deposited upon it.

The piston of the stack conveyor cylinder 138 remains in elevated position during the stacking cycles until cam wheel 24 is advanced by the pawl 25 to a position to close the switch 23 as explained earlier. This energizes the winding 180 of the valve and thereby shifts the piston and ratchet wheel 140 in a direction to advance the stack conveyor one step as indicated in Figure 4. Upon the next stacking cycle, the cam 182 opens switch 23 causing the valve to shift to the position shown in Figure 12, where it remains until the cam is rotated by the stacking reciprocation to again close switch 23 and advance the stack conveyor one step. As noted earlier, this control circuit is electrically independent of the transfer circuit, but is mechanically responsive to the reciprocations of the stacking mechanism.

As indicated earlier, the apparatus is also adapted to be placed under the direct mechanical control of a tile press or similar machine which advances the tiles in a positive manner. The modified apparatus is described in detail later, but it is to be noted at this point that the "cycle switch," indicated in broken lines in the diagram of Figure 14, performs the same function as the photo-electric responsive "tile counting switch" shown. When the modified cycle switch is employed, the photo-electric equipment and tile counting switch are omitted and the remaining components of the control circuit shown in Figure 14, cooperate in the same manner with the cycle switch as above described.

From the foregoing description of the photo-electric responsive control system, it will be observed that the transfer apparatus is independent of the main conveyor and operates only in response to the individual tile pieces as they are advanced from the main conveyor to the receiving conveyor. Since the transfer units are self-contained and require no mechanical interconnection with the conveyor which they serve, the units are highly adaptable and can be installed very conveniently throughout the plant wherever needed. For the same reason, the apparatus is highly flexible in respect to the rate of advancement of the tiles and will handle the tile pieces and stack them reliably at any rate of advancement up to the operating speed of the apparatus.

It will be understood, of course, that the number of tile pieces per row and the number of rows per stack is arbitrary and that the apparatus can be changed to accommodate any reasonable requirements. It will also be understood that the apparatus will accommodate ware pieces other than tiles by making appropriate provisions in the positioning conveyor and manifold.

*Modified structure*

The modified structure shown in Figures 16 and 17 performs the tile counting and feeding operations described above but differs essentially in the following respects: First it provides mechanical counting of the tiles, as distinguished from photo-electric counting. Secondly, it provides a positive feed, as distinguished from the conveyor system for advancing the tiles to the transfer manifold.

The modified counting mechanism is of advantage, particularly when the tiles are discharged directly from a tile press to the transfer mechanism, since it takes advantage of the movements of the press to perform the counting operation mechanically in synchronism with the tile forming operations. It is also contemplated to apply the mechanical counting apparatus to conveyors or other equipment which advances the tiles consecutively in a positive manner.

As explained earlier, the transfer apparatus is generally self-contained, and when used with the photo-electric equipment, it responds in its operating cycles to the random advancement of the tiles to it. When used with the mechanical counting mechanism, as explained in detail later, the transfer apparatus is the same except that the counting apparatus includes an electrical cycle switch which is interconnected with the control system to initiate the transfer cycles in response to the tripping of the switch by the tile press or other tile handling equipment.

The positive feed of the modified arrangement is accomplished by a sweep arm mechanism which is effective to engage and advance the tile pieces between a rotating brush and conveyor which carries the tile pieces to the transfer manifold. The sweep arm mechanism is also connected mechanically to the tile press; therefore the cycle switch and sweep arm mechanism operate in synchronism with each other in time with the operating cycles of the tile press to count and advance the tiles in a positive manner to the transfer manifold. By virtue of the two cooperating elements therefore, both the photo-electric apparatus and the receiving and positioning conveyors for spacing and counting the tiles, as explained above, may be omitted.

The coordinated conveyor and photo-electric equipment is ideal in handling the average tile; however, there are certain factors requiring special treatment for which the modified mechanical counting and positive feed mechanism is particularly designed. By way of example, in pressing certain types of tile pieces, a fin or flashing is formed around the edges of the tile pieces. In order to produce marketable tiles, this flashing must be removed prior to the firing operation, and preferably in a rapid reliable manner. Fin removal is accomplished by the sweep arm mechanism which cooperates with the above mentioned rotating brush. The brush has sufficient pressure and stiffness to remove the fins as the tile piece is forced by the sweep arm past the rotating brush. A conveyor belt is located immediately beneath the brush to support and advance the tile piece relative to the brush.

The mechanical counting apparatus is of advantage in counting tile pieces which, because of size or other factors, are difficult to count accurately by photo-electric operation. For example, in the pressing and handling of certain tile pieces, the pieces are advanced in pairs instead of a single stream. Obviously the photo-electric counter is not intended and cannot be made to respond accurately if the tile pieces are advanced in multiple streams.

Briefly, therefore, the modified structure supplements the photo-electric responsive apparatus to adapt the transfer mechanism to the handling of tiles which require special treatment, both in the counting and in the feeding operations. With the exception of these two operations, the transfer mechanism is otherwise the same as described in detail above and includes the same control system, except that the cycle switch is interconnected in the system in place of the photo-electric circuit.

Figure 17:
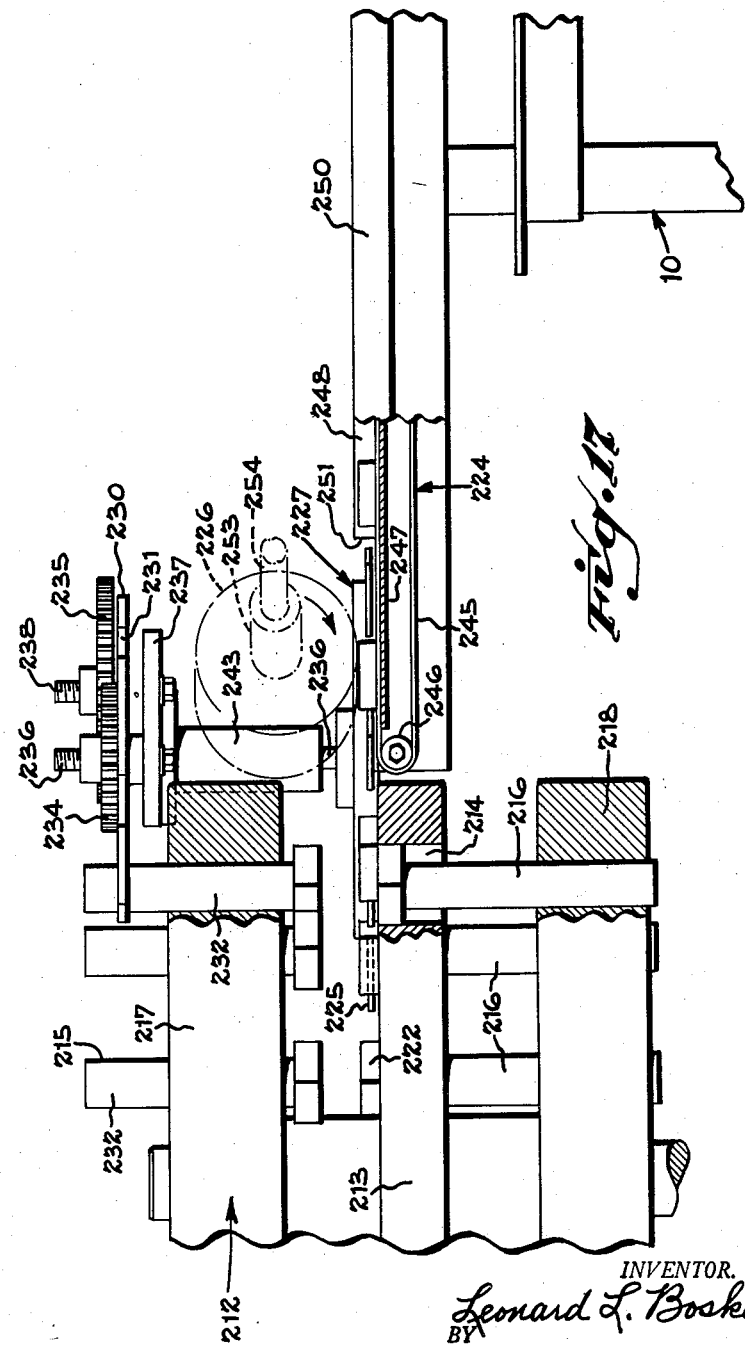
Figure 17 is a side elevation projected from Figure 16, further illustrating the modified structure.

In the disclosure of Figures 16 and 17, the modified structure is incorporated in a tile press of the rotary type. This press is standard equipment and is illustrated diagrammatically in order to exemplify the operating principles of the modified structure. The description is therefore limited only to those parts of the press which are essential to an understanding of the structure and operation of the counting and feed mechanisms.

As shown in Figure 16, the tile press consists essentially of a rotary turret indicated generally at 212, which includes a rotary die plate 213 (Figure 17), having a plurality of die cavities 214, and upper and lower die plungers 215 and 216, which reciprocate with respect to the die cavities. The upper and lower plungers are slidably mounted respectively in upper and lower plunger guides 217 and 218, which rotate in unison with the die plate while the plungers reciprocate upon their vertical axes with respect to the die cavities.

The operation of pressing the tile pieces is a continuous one, the pulverized clay being fed to the die plate at the loading station which is located approximately as indicated at 220. The lower plungers assume a lowered position in the die cavities as the cavities advance through the loading station so that the pulverized clay may be deposited by means of deflectors in the die cavities. As the turret rotates in the direction indicated by the arrow, the plungers are advanced axially toward one another by cams (not shown), to compress the pulverized clay in the cavities. Pressure means supplementing the cams exert the final impulse upon the plungers at high pressure to compact the clay to its final shape and thickness before the turret advances to the discharge station, which is located approximately as at 221.

As the turret approaches the discharge station, the upper plungers are retracted upwardly to a position well above the die cavities and the lower plungers advance upwardly sufficient distance to force the formed tile piece, indicated at 222, through the cavity to the plane of the top surface of the die plate (Figure 17). The freshly formed tile pieces are now ready to be discharged from the press and advanced to the transfer mechanism.

As shown in Figure 16, the tile pieces at the discharge station advance with the rotating turret until they encounter the angularly related deflector arm 223 which projects across the top surface of the die plate in a position to intercept the advancing tile piece. The angularity of the deflector arm with respect to the arc of movement of the tile pieces is sufficient to cause the tile piece to advance outwardly along the deflector. The deflector arm leads to the belt type conveyor 224, which is arranged to transport the tile piece to the transfer manifold. Conveyor 224 extends directly to the transfer manifold since the receiving and positioning conveyors are not required in the present structure.

As the tile pieces are arrested by the deflector arm and moved toward the conveyor, they are successively engaged and propelled in a positive manner by the rotating sweep arms 225 and passed under the rotating brush, which is indicated at 226 above conveyor 224. The sweep arm assembly 227 and driving system are explained in detail later.

The present arrangement is designed to advance the tiles in groups of eight for advancement to, and transfer by, the manifold as in the photo-electric controlled mechanism described above. For this purpose the sweep arm assembly is provided with eight individual arms 225 and is adapted to execute one complete revolution upon the discharge of eight tile pieces by the tile press. The sweep arm assembly is driven in time with the rotating turret by means of a gear train in driving connection with the turret, as described in detail later. In addition, the cycle switch, indicated at 228, which initiates the transfer cycle when the row of eight tiles is positioned below the transfer manifold, is also mounted in a position to be tripped each time the sweep arm assembly completes one revolution.

Described in detail, the driving connection from the turret to the sweep arm assembly and switch consists of a star wheel 230 having notches 231 formed around its periphery. It is to be noted that the shanks 232 of the die plungers extend upwardly above the top plane of the plunger guide 217 in a position to mesh with the notches of the star wheel. The notches of the star wheel are spaced apart from one another to mesh with the plunger shanks and thus rotate the star wheel in time with the turret.

The drive from the star wheel is extended to the wheel 233 of the sweep assembly by way of the gear 234 which is fastened to the star wheel and which meshes with the idler gear 235. The star wheel is rotatably mounted upon a shaft 236, having its lower end fastened to the mounting plate 237 (Figure 17). The idler gear is rotatably mounted upon a stub shaft 238 which also has its lower end fastened to the mounting plate. The mounting plate in turn is fastened by means of brackets 240 to the frame of the tile press.

The drive from the idler gear 235 is transmitted to the sweep wheel by means of gear 241 which is keyed upon the shaft 242, shaft 242 being rotatably mounted with respect to the mounting plate. The mounting plate includes a sleeve 243 which projects downwardly to the plane of the die plate and conveyor and the sweep wheel 233 is keyed upon the lower end of the shaft as best shown in Figure 17.

By this arrangement the sweep wheel and its arms are located in a plane contiguous to and spaced slightly above the plane of the die plate and conveyor such that the arms sequentially engage and advance the tile pieces as they are intercepted by the deflector arm 223. As best shown in Figure 16, the sweep arms are disposed generally in a tangent with respect to the sweep wheel and their outer ends are rounded as at 244 to establish engagement against the rearward edges of the tile pieces. As explained above, the sweep wheel executes one complete revolution with the discharge of eight tile pieces from the rotating die plate. Correspondingly the sweep wheel is provided with eight sweep arms so as to discharge the tile pieces in synchronism with the advancement of the rotating die plate.

It will be noted that the angular relationship of the deflector corresponds to the angle defined by the leading edge of the tile as it encounters the deflector (Figure 16). Since the rotary movement of the sweep arm assembly is synchronized with the rotary movement of the turret, the arms follow the tiles in time with their advancement and interception by the angular guide. Thus, as shown in Figure 16, the sweep arm engages the tile piece as it reaches the outer end of the deflector and propels it in a positive manner under the rotating brush 226, which is disposed in angular relationship above the conveyor 224. The conveyor supports the tile piece under the relatively heavy pressure imposed upon it by the rotating brush, which rotates in a direction counter to the lineal advancement of the conveyor as indicated.

The conveyor 224 comprises a belt 245 passing around roller 246 which is mounted adjacent the periphery of the rotating die plate. The conveyor belt is located in the plane of the die plate and a slight clearance is provided between the edge of the plate and the portion of the belt passing around the pulley, such that the tile pieces may pass without interference from the die plate to the conveyor. The conveyor belt is supported upon a plate 247 similar to the conveyor system previously described, and includes side rails 248 and 250 arranged to confine the tile pieces upon it.

Since the sweep arms travel in a plane contiguous to the plane of the conveyor, the side plate 248 is relieved as at 251 to provide clearance for the rotating sweep arms as they pass across the conveyor surface. It will also be observed that the side rail 248 has its forward end flared outwardly as at 252 to provide a converging throat in combination with the deflector 223. This aids to guiding the tile pieces during their transfer from the die plate to the conveyor surface.

As explained above, rotating brush 226 is adapted to remove the fins or flashing which may protrude above the surface of the tiles along their edges after they are pressed. For this purpose the brush has relatively stiff bristles and imposes fairly heavy sweeping pressure upon the advancing tiles. The pressure and rotation of the brush counter to the direction of advancement of the conveyor, is sufficient to effectively clean off the fins. However, the repelling action of the brush normally would prevent the tile pieces from being passed under it. It is therefore the principal function of the sweep arms to engage and force the tile pieces under the rotating brush in a positive manner so that after cleaning they may be advanced across the conveyor to the transfer manifold.

It will be observed in Figure 16 that the axis of rotation of the brush is disposed upon an acute angle with respect to the longitudinal axis of the conveyor. The purpose of this is to relate the line of movement of the bristles angularly to all four sides of the tile piece so as to insure complete removal of fins. In other words, if the brush were rotated upon an axis at right angles to the axis of the conveyor, then the direction of movement of the bristles would be at right angles to the leading and trailing edges of the tile piece. However, the line of motion would then be parallel with the side edges of the tile piece and would render the brushing action at least partially ineffective with respect to the fins along the side edges. The angulation of the brush, therefore, insures complete removal of fins from all four sides of the tile piece.

The brush is rotatably mounted in a bearing 253 which is mounted by means of a bracket (not shown), secured in fixed position with respect to the conveyor. The brush may be rotated either by a separate motor (not shown) or by a flexible shaft 254 extending to the driving system of the tile press. The conveyor belt 245 may also be driven by the same means, that is to say, it may be connected to the brush motor or it may be connected to the driving system of the tile press.

After passing beneath the brush, the tile pieces are advanced by the conveyor belt 245 directly to the manifold where they engage the stop element 17 (Figure 6) which arrests them and causes them to form solid rows for engagement by the manifold.

The cycle switch 228 is mounted by means of a suitable bracket upon the mounting plate 237 and its plunger includes a roller 255 which is adapted to be engaged by the trip dog 256 secured to the gear 241 which drives the sweep wheel. Upon each complete rotation of the sweep wheel therefore, the switch is tripped, causing the control system to execute a transfer cycle. As explained earlier, the cycle switch 228 performs the same function as the photo-electric unit, amplifying system and rotary tile counting switch, previously described in connection with Figure 14.

As indicated in Figure 14, the cycle switch 228 is connected by the broken line 257 to power line 161. A broken line 258 extends from the cycle switch to the contact 196 of the interlock relay. Thus each time the switch is tripped by the dog 256, line 198 will energize the "vacuum" and "advance" windings causing application of vacuum to the manifold and operation of the transfer cylinder, thus initiating the transfer cycle. It is to be understood that photo-electric cell, amplifying circuit, and tile counting switch, all shown in Figure 14, are omitted when the mechanical cycle switch is connected as shown.

After having been initiated, the apparatus continues through its complete cycle, bringing the manifold back to its starting position after the row of tiles is transferred and deposited upon the stack conveyor. The components of the control system, including the manifold switch 111 which reverses the transfer motion and also the components which regulate the stack conveyor, are the same as previously described in connection with Figure 14. It will be apparent, therefore, that the transfer apparatus performs the same transfer cycle whether the cycle is initiated by the cycle switch or by the photo-electric apparatus.

Having described my invention, I claim:

1. An apparatus for transferring work pieces to a support surface comprising a transfer station, a conveyor adapted to advance the work pieces linearly to the transfer station, a counting device mounted along said conveyor and responsive to the advancement of individual work pieces along the conveyor, stationary arresting means mounted along the conveyor downstream from the counting device in a position to arrest the linearly advancing work pieces at the transfer station, said arresting means being effective to assemble the work pieces in solid end-to-end rows upon the conveyor at the transfer station, a transfer mechanism normally disposed in a stationary position above the conveyor at the transfer station, said transfer mechanism having work pick-up means above the conveyor and parallel therewith, the said pick-up means located relative to the said arresting means to engage the arrested row of work pieces on the conveyor for transfer of said assembled row of work pieces from the transfer station to the support surface, power means connected to the transfer mechanism and adapted to reciprocate the same laterally with respect to the conveyor and support surface, said counting device being responsive to the advancement of a predetermined number of work pieces to the transfer station, the counting device being connected to the power means of the transfer mechanism and being effective to initiate the engagement and transfer of assembled rows of work pieces in response to linear advancement of the predetermined number of work pieces.

2. An apparatus for transferring and stacking work pieces comprising a transfer station, means for advancing the work pieces linearly to the transfer station, a transfer mechanism normally disposed in a stationary position above the transfer station and adapted to engage work pieces advanced to the transfer station, the transfer mechanism being adapted to reciprocate and transfer the work pieces laterally from the transfer station, control means responsive to the linear advancement of the work pieces to the transfer station, the control means being connected to the transfer mechanism and being effective to initiate the engagement and reciprocations thereof to cause transfer of the work pieces successively in response to lineal advancement of successive work pieces, a stack conveyor adjacent the transfer station, the transfer mechanism being adapted to deposit the work pieces one upon another on the stack conveyor to form stacks, a second control means responsive to the reciprocations of the transfer mechanism, the second control means being connected to the stack conveyor and being effective to advance the stack conveyor in stepwise progression upon the deposit of a predetermined number of work pieces upon each stack.

3. An apparatus for transferring and stacking work pieces comprising a transfer station, means for advancing the work pieces linearly toward the transfer station, a stop element adapted to arrest the linearly advancing work pieces and thereby pack the same in end-to-end row formation at said transfer station, a transfer mechanism normally disposed in a stationary position above the transfer station and adapted to engage the row of work pieces at the transfer station, the transfer mechanism being adapted to reciprocate and transfer the row of work pieces laterally from the transfer station, a stacking conveyor disposed adjacent the transfer station, a counting device responsive to the linear advancement of the work pieces toward the transfer station, said counting device being interconnected with the transfer mechanism and adapted to initiate the reciprocations of the transfer mechanism when a predetermined number of work pieces is advanced to the transfer station, a second counting device which is responsive to the reciprocations of the transfer mechanism, power means in driving connection with the stack conveyor adapted to advance the same in stepwise progression, said second counting device being interconnected with said power means and adapted to energize the same when a predetermined number of rows are deposited one upon another in stack formation upon the stack conveyor.

4. An apparatus for transferring work pieces to a support surface comprising a transfer station, a conveyor adapted to advance the work pieces linearly to the transfer station, a counting device mounted along said conveyor and responsive to the advancement of individual work pieces along the conveyor, stationary arresting means mounted along the conveyor downstream from the counting device in a position to arrest the linearly advancing work pieces at the transfer station, said means being adapted to assemble a plurality of work pieces in solid row formation at the transfer station, a transfer mechanism normally disposed in a stationary position above the transfer station, the transfer mechanism having work pick-up means above the conveyor and parallel therewith, said pick-up means located relative to the said arresting means for engagement with the row of work pieces arrested at the transfer station, power means connected to the transfer mechanism, guide means connected to the transfer mechanism guiding the same through two rectilinear paths of movement, said paths being defined by a substantially horizontal line joined to a substantially vertical line, the power means being adapted to reciprocate the transfer mechanism through a cycle of reciprocation along said horizontal path from said stationary position and along said vertical path to the support surface and back to the stationary position, means associated with the transfer mechanism effective to engage the row of work pieces at the transfer station, said counting device being connected to the power means and effective to initiate reciprocation of the transfer mechanism from the stationary position to the support surface in response to the linear advancement of a predetermined number of work pieces to the transfer station, and a control device associated with the transfer mechanism, said control device arranged to be tripped at the limit of motion of the transfer mechanism downwardly along said vertical line, said control device being connected to the power means and, upon being tripped, causing release of the row of work pieces upon the support surface and reciprocation of the transfer mechanism from the support surface back to said stationary position.

5. An apparatus for transferring work pieces as the pieces are fed at random to the apparatus, said apparatus comprising a receiving conveyor adapted to receive and advance the random work pieces linearly, means associated with the receiving conveyor adapted to partially retard the advancement of the work pieces, said means being effective to pack the random work pieces for advancement linearly in end-to-end relationship, a positioning conveyor adapted to receive the packed work pieces, driving means connected to the positioning conveyor for advancing the same a rate greater than the receiving conveyor whereby the packed work pieces are advanced in spaced relationship upon the positioning conveyor, a counting device associated with positioning conveyor adapted to count the spaced work pieces in response to the advancement thereof, stop means associated with the positioning conveyor adapted to arrest the advancing work pieces after passing the counting device, a gripping device adapted to reside normally above the positioning conveyor in a position to grip the work pieces arrested by the stop means, said stop means grouping the arrested work pieces in solid row formation on the conveyor, said gripping device extending parallel with the conveyor and having work gripping devices engageable with a plurality of said work pieces arrested in solid row formation on the conveyor, power means for energizing the gripping device, a second power means connected to said gripping device adapted to reciprocate the same transversely with respect to the positioning conveyor, said counting device being interconnected with the first and second power means and operable to energize the same concurrently in response to the passage of a predetermined number of work pieces to the stop means, whereby the work pieces are engaged by the gripping device and shifted from the positioning conveyor.

6. An apparatus for transferring work pieces to a support surface as the pieces are advanced at random to the apparatus, said transfer apparatus comprising a conveyor system adapted to receive and transport the work pieces linearly, a photo-electric unit associated with the conveyor, said unit providing a light beam which is interrupted by each work piece during linear advancement thereof whereby an electrical impulse is generated upon passage of each work piece, counting means electrically connected to the photo-electric unit, a transfer station disposed adjacent the discharge end of the conveyor system, means for arresting the work pieces at the transfer station and grouping the work pieces in solid row formation on the conveyor system, a transfer device disposed above the conveyor system and having a plurality of work pick-up elements extending parallel with the row of work pieces, said pick-up elements gripping the row of work pieces when the pieces are arrested at the transfer station, and power means connected to the said transfer device adapted to shift the same from the transfer station with the work pieces gripped thereon, the counting means being connected to said power means and adapted to energize the power means whereby the gripping device is shifted to the support surface when a predetermined number of work pieces is arrested in row formation at the transfer station.

7. An apparatus for transferring work pieces to a support surface as the pieces are advanced at random to the apparatus, said transfer apparatus comprising a conveyor system adapted to receive and transport the work pieces linearly, a photo-electric unit associated with the conveyor, said unit providing a light beam which is interrupted by each work piece during linear advancement thereof whereby an electrical impulse is generated upon passage of each work piece, counting means electrically connected to the photo-electric unit, a transfer station disposed adjacent the discharge end of the conveyor system, means for arresting the work pieces at the transfer station, said arresting means grouping the work pieces in solid row formation upon the conveyor system, a transfer device extending above the conveyor system at the transfer station, the transfer device having a series of spaced work pick-up elements parallel with the row of work pieces arrested at the transfer station and engageable with the row when the pieces are arrested at the transfer station, power means connected to the said transfer device adapted to shift the same from the transfer station with the work pieces gripped thereon, the counting means being connected to said power means and adapted to energize the power means whereby the gripping device is shifted to the support surface when a predetermined number of work pieces is arrested at the transfer station, and a control element associated with the gripping device for movement therewith, said control element being arranged to be tripped upon shifting of the transfer device to the support surface, said control element being connected to the power means and adapted to energize the power means whereby the transfer device is shifted back to the transfer station.

8. An apparatus for assembling work pieces upon a transfer station and depositing the same successively upon a stacking surface, said apparatus comprising, a vacuum device adapted to grip and release the work pieces upon application and release of vacuum, said vacuum device residing normally in stationary position above the transfer station at spaced relationship to engage workpieces interposed between the transfer station and vacuum device, a shiftable electrically operated valve in communication with the vacuum device and adapted to apply vacuum to and relieve vacuum from the device, a carriage connected to the vacuum device, track means movably supporting the carriage for reciprocation of the carriage and vacuum device through two rectilinear paths of movement, said paths being defined by a substantially horizontal line joined to a substantially vertical line, an air motor having a member movable in a horizontal plane, link members having respective opposite ends pivotally connected to the movable member and carriage and adapted to reciprocate the same in forward and reverse directions through said rectilinear paths of movement, a second shiftable electrically operated valve in communication with the air motor and adapted to apply air pressure to the motor to cause the same to shift the carriage in said forward and reverse directions through said rectilinear paths of movement, electrical control means in electrical connection with both of said electrically operated valves, said control means being effective to apply vacuum to the vacuum device and to energize the air motor in forward direction whereby the work piece is engaged at the transfer station and shifted to the stacking surface.

9. An apparatus for assembling work pieces upon a transfer station and depositing the same successively upon a stacking surface, said apparatus comprising, a vacuum device adapted to grip and release the work pieces upon application and release of vacuum, said vacuum device residing normally in stationary position above the transfer station at spaced relationship to engage workpieces interposed between the transfer station and vacuum device, a shiftable electrically operated valve in communication with the vacuum device and adapted to apply vacuum to and relieve vacuum from the device, a carriage connected to the vacuum device, track means slidably supporting the carriage for reciprocating the carriage and vacuum device, the carriage being adapted to shift the device through two rectilinear paths of movement from the transfer station to the stacking surface, said paths being defined by a substantially horizontal line joined to a substantially vertical line, an air motor having a member movable in a horizontal plane, link members having respective opposite ends pivotally connected to the movable member and carriage and adapted to reciprocate the same in forward and reverse directions through said rectilinear paths of movement, a second shiftable electrically operated valve in communication with the air motor and adapted to apply air pressure to the motor to cause the same to shift the carriage in said forward and reverse directions through said rectilinear paths of movement, electrical control means in electrical connection with both of said electrically operated valves, said control means being effective to apply vacuum to the vacuum device and to energize the air motor in forward direction whereby the work piece is engaged at the transfer station and shifted to the stacking surface, a control switch mounted upon the vacuum device, mechanical actuating means connected to said switch effective to trip the same upon deposit of the work piece upon the stacking surface, said switch being connected electrically to both of said shiftable electrically operated valves and being effective to shift said valves to respective positions for relieving the vacuum and for energizing the air motor in reverse direction whereby the work piece is released at the stacking surface and the vacuum device is shifted through said rectilinear paths back to the transfer station.

10. An apparatus for transferring and stacking work pieces in row formation as the work pieces are transported at random spacing to the apparatus, said apparatus comprising a conveyor, means for driving the conveyor, a transfer station adjacent one end of the conveyor, said conveyor adapted to advance the work pieces linearly in spaced relationship toward said transfer station, a counting device associated with the conveyor adapted to count the work pieces as the same are advanced in spaced relationship toward the transfer station, stops means at said transfer station being adapted to arrest the advancing work pieces and pack the same in end-to-end row formation as the conveyor advances relative to the stop means, a vacuum manifold residing at the transfer station above the work pieces arrested in end-to-end formation, said manifold having a plurality of suction elements spaced apart from one another parallel with the conveyor means, said manifold located relative to the stop means in a position engageable with the packed row of work pieces upon application of vacuum, a transfer mechanism connected to said manifold, a motor connected to the transfer mechanism adapted to shift the manifold with respect to the transfer station, said counting device being interconnected with the motor and adapted to energize the same upon passage of a predetermined number of work pieces to said transfer station, a shiftable valve connected to said manifold, said counting device being connected to said valve and adapted to apply vacuum to said manifold concurrently with the energization of said motor and thereby cause the manifold to grip the packed row of work pieces before the manifold is shifted from the transfer station.

11. In an apparatus for transferring work pieces arranged in row formation from a transfer station and stacking the rows of work pieces one upon another upon a stacking surface, a transfer mechanism for engaging, transferring and releasing said rows of work pieces, said transfer apparatus comprising a carriage, guide means engaging the carriage and adapted to guide the same through two rectilinear paths of movement, said rectilinear paths being defined by a horizontal line joined by an arcuate line to a vertical line, a motor having a member movable in a horizontal plane, link members having respective opposite ends pivotally connected to the movable member and said carriage and adapted to reciprocate the carriage through said rectilinear paths of movement, a vacuum device yieldably connected to the carriage, said vacuum device disposed above the row of work pieces at the transfer station, said vacuum device including a series of vacuum pick-up elements spaced apart from one another parallel with the row of work pieces and engageable therewith, the carriage and vacuum device being movable laterally from the transfer station along said horizontal line then downwardly along said vertical line toward the stacking surface, the carriage overtraveling the vacuum device upon engagement of the vacuum device and work piece upon the stacking surface, a shiftable valve in communication with the vacuum device and adapted to apply and relieve the vacuum, a control element mounted upon the carriage, said control element being connected to said shiftable valve, mechanical connecting means extending between the carriage and said control element and adapted to shift the same in response to the overtravel of the vacuum device upon deposit of the row of work pieces on the stacking surface, said control element being effective to shift said valve to a position for relieving the vacuum thereby causing the said row to be released from the vacuum device upon the stacking surface.

12. In an apparatus for handling work pieces, a transfer mechanism for engaging, transferring and releasing said work pieces, said transfer apparatus comprising a carriage, guide means engaging the carriage and adapted to guide the same through two rectilinear paths of movement, said rectilinear paths being defined by a horizontal line joined by an arcuate line to a vertical line, a motor connected to the carriage and adapted to reciprocate the carriage through said rectilinear paths of movement, said motor having a shiftable member adapted to reciprocate in forward and reverse directions along a generally horizontal path, guide means engaging said shiftable member and adapted to guide the member in a horizontal path, and a plurality of links extending from said shiftable member, said links having their opposite ends pivotally connected respectively to said shiftable member and to said carriage, said links being adapted to sustain said carriage in a substantially horizontal plane during reciprocation of the carriage through said rectilinear paths of movement the links residing in a generally horizontal plane during movement of the carriage along the said horizontal line, said links swinging in toggle fashion during movement of the carriage along the said vertical line and thereby decelerating the carriage during movement along the said vertical line outwardly from the said horizontal line, and a pick up device connected to the carriage, the pick up device being adapted to engage a work piece when the carriage is disposed at one limit of reciprocation and thereby transfer the same through said rectilinear path, the pick up device being adapted to release the work piece when the carriage is disposed at the opposite limit of reciprocation.

13. In an apparatus for handling work pieces, a transfer mechanism for engaging, transferring and releasing the work pieces, said transfer mechanism comprising a motor, a cross head connected to the motor, a generally horizontal cross head guide the cross head being slidably engaged in said guide and adapted to be reciprocated by said motor in a horizontal path of movement, a carriage, a work pick up device mounted on the carriage, a carriage guide member, said guide member having a carriage guide track comprising a horizontal track section joined to a vertical track section, said carriage being slidably engaged in said track, and a plurality of connecting links, said links having their respective opposite ends pivotally connected to the cross head and carriage, said links being adapted to transmit the horizontal reciprocations of the cross head to the carriage whereby the carriage and pick up device are reciprocated along said horizontal and vertical track sections in response to the reciprocations of the cross head along said horizontal cross head guide, the links residing in a generally horizontal plane during movement of the carriage along the horizontal track section and swinging in toggle fashion during movement of the carriage along the vertical track section and thereby reducing the carriage rate of motion along the vertical track section.

14. In an apparatus for depositing work pieces successively one upon another, a vacuum device adapted to grip and release the work pieces upon application and release of vacuum, a transfer station having a surface to support the workpieces in position to be engaged by the vacuum device, said vacuum device residing normally in stationary position above said surface to engage a workpiece interposed between said surface and vacuum device, a shiftable electrically operated valve in communication with the vacuum device and adapted to apply and relieve the vacuum, a substantially horizontal stacking surface adapted to support the stacks, a carriage adapted to support and shift the vacuum device, track means for guiding the carriage and vacuum device through two rectilinear paths of movement, said paths being defined by a substantially horizontal line joined to a substantially vertical line, the vacuum device being movable along said horizontal line then downwardly toward the stacking surface along said vertical line, a motor having a member movable in a horizontal plane, link members having respective opposite ends pivotally connected to the movable member and carriage and adapted to reciprocate the same in forward and reverse directions through said rectilinear paths of movement, means of energizing said motor and thereby initiating reciprocation toward the stacking surface, and means being effective to shift said valve and thereby apply vacuum to the vacuum device during said reciprocation whereby the work pieces are transported to the stacking surface, yieldable means connecting the vacuum device to said carriage, a switch mounted upon the carriage, mechanical connecting means between the vacuum device and said switch, said carriage being adapted to overtravel the vacuum device upon deposit of the work piece upon the stacking surface during said vertical path of downward movement, said connecting means being effective to trip said switch upon overtravel of the carriage, said switch being electrically connected to said shiftable valve and being effective to shift the valve to a position to relieve the vacuum upon tripping thereof and thereby release the work piece in response to the overtravel of the carriage.

References Cited in the file of this patent

UNITED STATES PATENTS

| | | |
|---|---|---|
| 1,139,070 | Phelps | May 11, 1915 |
| 1,161,581 | Anderson | Nov. 23, 1915 |
| 1,510,717 | Straight | Oct. 7, 1924 |
| 2,011,661 | Spinosa et al. | Aug. 20, 1935 |
| 2,071,859 | Steiner | Feb. 23, 1937 |
| 2,135,986 | Morton et al. | Nov. 8, 1938 |
| 2,143,779 | Kaufman | Jan. 10, 1939 |
| 2,183,293 | Leach | Dec. 12, 1939 |
| 2,253,283 | Minaker | Aug. 19, 1941 |
| 2,609,108 | Peterson et al. | Sept. 2, 1952 |